United States Patent [19]

Sekiguchi et al.

[11] Patent Number: 5,305,714
[45] Date of Patent: Apr. 26, 1994

[54] FUEL SUPPLY SYSTEM FOR AN INTERNAL COMBUSTION ENGINE

[75] Inventors: Kiyonori Sekiguchi, Okazaki; Toshihiko Igashira, Toyokawa; Kenji Kanehara, Toyohashi; Nobuo Imatake, Nishio; Jun Yamada; Nobuyuki Murate, both of Okazaki; Osamu Kito, Nisshin, all of Japan

[73] Assignees: Nippon Soken, Inc., Nishio; Toyota Jidosha Kabushiki Kaisha, Toyota, both of Japan

[21] Appl. No.: 908,270

[22] Filed: Jul. 2, 1992

[30] Foreign Application Priority Data

| Jul. 3, 1991 | [JP] | Japan | 3-162844 |
| Oct. 1, 1991 | [JP] | Japan | 3-253737 |
| Feb. 7, 1992 | [JP] | Japan | 4-022725 |
| Feb. 14, 1992 | [JP] | Japan | 4-028058 |

[51] Int. Cl.$^5$ ............................................. F02B 43/08
[52] U.S. Cl. ...................................... 123/3; 123/DIG. 12
[58] Field of Search .................. 123/3, DIG. 12, 1 A, 123/527

[56] References Cited

U.S. PATENT DOCUMENTS

| 4,016,836 | 4/1977 | MacKay et al. | 123/3 |
| 4,018,190 | 4/1977 | Henault | 123/3 |
| 4,178,882 | 12/1979 | Anderson et al. | 123/3 |
| 4,211,537 | 7/1980 | Teitel | 123/3 |
| 4,214,699 | 7/1980 | Buchner et al. | 123/1 A |
| 4,225,320 | 9/1980 | Gell | 123/3 |
| 4,290,267 | 9/1981 | Buchner et al. | 123/3 |
| 4,302,217 | 11/1981 | Teitel et al. | 123/3 |
| 5,027,780 | 3/1991 | Sekiguchi et al. | 123/520 |
| 5,067,447 | 11/1991 | Iwaki et al. | 123/3 |
| 5,082,048 | 1/1992 | Iwaki et al. | 123/3 |

FOREIGN PATENT DOCUMENTS

| 61-220009 | 9/1986 | Japan . |
| 63-246459 | 10/1988 | Japan . |
| 1-216024 | 8/1989 | Japan . |
| 3-961 | 1/1991 | Japan . |

Primary Examiner—Noah P. Kamen
Assistant Examiner—Erick Solis
Attorney, Agent, or Firm—Cushman, Darby & Cushman

[57] ABSTRACT

A fuel supply system for a hydrogen gas engine, having a metal hydride tank in which pellets or powders of a metal hydride absorbing and storing alloy are stored. A heat exchange device is arranged in the tank in contact with the metal hydride therein. The heat exchange device is connected to a heating medium source, such as an engine water jacket, for supplying the heating medium to the heat exchange device, for separating hydrogen gas from the metal hydride. A fuel supply conduit is provided for connecting the metal hydride tank with the engine. A hydrogen gas flow control valve and a hydrogen gas flow meter are arranged in series in the conduit. A controller is provided for controlling the hydrogen gas flow control valve so that a desired amount of the hydrogen gas, as detected by the hydrogen gas flow meter, is obtained. A sub tank may be provided for storing an excess amount of hydrogen gas from the main tank, which is introduced into the engine via a sonic valve. An indicator for measuring an amount of hydrogen gas remaining, from the volume of the metal hydride, is also provided.

23 Claims, 15 Drawing Sheets

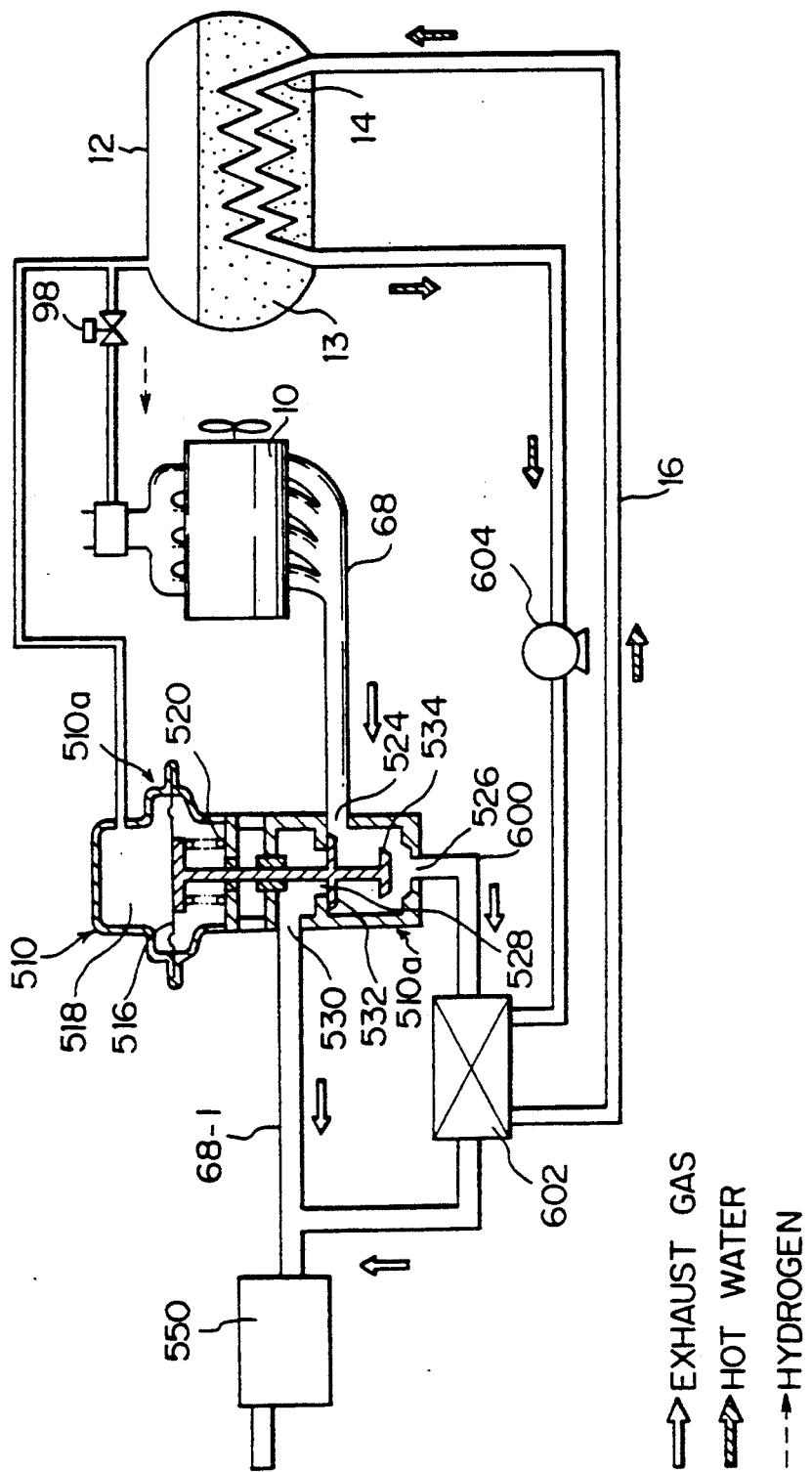

FUEL SUPPLY SYSTEM FOR AN INTERNAL COMBUSTION ENGINE

BACKGROUND OF THE INVENTION

1. Field of the Invention

The present invention relates to a fuel supply system for an internal combustion engine.

2. Description of the Related Art

Attempts have long been made to use hydrogen as a fuel for an internal combustion engine, but such attempts were abandoned. Recently however, interest in these attempts has been revived due to the finding that hydrogen produces a low amount of toxic emissions, which is advantageous from the view point of protecting the environment, and due to the urgent need for the development of new fuel resource because of the looming shortage of fossil fuels in the near future. In an automobile using hydrogen as a fuel, a fuel tank having a high pressure resistance and a cylindrical shape, in which liquid hydrogen is stored, is usually employed. Such a high pressure type tank, however, is disadvantageous from the view point of easy handling, and therefore, a new construction of a fuel tank has been proposed, in place of the high pressure type, wherein a hydrogen absorbing and storing alloy, such as Ti-Fe, is charged in a tank as fine pellets or powders thereof, and gaseous hydrogen is absorbed by the Ti-Fe pellets to provide a metal hydride stored in the pellets. Heating the pellets causes the hydrogen gas to be separated therefrom. The hydrogen gas can thus be supplied to an internal combustion engine. The handling of such a system using Ti-Fe pellets is relatively easy, compared with that of a high pressure hydrogen tank, because a relatively large amount of high density hydrogen can be stored under a relatively small pressure.

Japanese Unexamined Patent Publication No. 61-220009 discloses a tank to be charged with the metal hydride pellets. This tank is equipped with a system for maintaining a predetermined constant pressure inside the metal hydride tank regardless of a change in a load on the internal combustion engine, and the system is constructed by a pressure sensor for detecting a pressure of the hydrogen gas in the tank, and an electric control device for calculating a pressure change in accordance with a lapse of time, i.e., a pressure gradient. A flow control valve is further provided and is responsive to a calculated pressure gradient for controlling an amount of hot engine cooling water fed from the engine to the tank, for heating the metal hydride, to thus control the amount of hydrogen gas separated from the pellets stored in the tank.

In Japanese Unexamined Patent Publication No. 1-216024, the metal hydride tank is provided with a temperature sensor, in addition to the pressure sensor. Furthermore, in addition to a main metal hydride tank, an auxiliary tank is provided and arranged in parallel to the main tank, and a switching valve is located in a pipe to the tanks, for controlling a selective introduction of the hot engine water to the tanks. A warning device is further provided for sounding an alarm when the amount of hydrogen remaining in the tank becomes too small, to thus prevent a situation such that the fuel supply is abruptly stopped while the vehicle is running. This prior art is provided with a plurality of pressure sensors arranged in gas passageways running from the tank to the internal combustion engine, a pressure control device, and a flow control device. The pressure control device and the flow control device are operated in accordance with the pressure values detected by the pressure sensors, to thus obtain a required control of the pressure and flow amount of the hydrogen gas.

In a prior art hydrogen engine provided with a metal hydride tank, as also seen from the above-mentioned first and second prior arts, the control of the amount of the hydrogen gas is executed by a predetermined heating or cooling of the metal hydride material, and the obtained hydrogen gas is introduced, via a pressure regulator device, to a carburetor or to fuel injection valves of the internal combustion engine. The pressure regulator mounted in a fuel supply conduit between the fuel tank and the carburetor or fuel injection valves is provided for maintaining a predetermined constant pressure of the hydrogen gas in the conduit. Such a control of the hydrogen pressure by the regulator is essential for obtaining a desired amount of hydrogen by controlling the duration of the time for which the fuel injection valves are open, without actually detecting the amount of hydrogen gas. Such a fuel supply system, however, suffers from the following drawbacks.

The regulator in the hydrogen supply conduit connecting the metal hydride tank with the fuel injectors can suffer from a large pressure loss across the regulator, compared with a gasoline engine, and this makes it difficult for the hydrogen engine to quickly obtain an amount of hydrogen gas required. Namely, hydrogen has a small molecular weight, and therefore, with respect to the same amount of air introduced into the internal combustion engine, a large volumetric amount of the hydrogen gas must be introduced when compared with a high density hydrocarbon fuel such as gasoline. Such a large volumetric amount of the hydrogen gas creates a large pressure loss across the regulator when the gas is passed therethrough, and therefore, upon an acceleration of the engine, the amount of hydrogen required by the engine is increased but the large pressure loss makes it difficult for the necessary amount of hydrogen gas to be quickly supplied to the engine, and thus the performance of the engine is degraded.

SUMMARY OF THE INVENTION

An object of the present invention is to provide a fuel supply system for a hydrogen engine, whereby a quick control of a supply of a desired amount of hydrogen gas required by the engine is obtained.

According to the present invention, a fuel supply system for an internal combustion engine is provided wherein hydrogen gas is used as the fuel, said system comprising:

a fuel tank in which a metal hydride is stored;

a heat exchange device arranged in said fuel tank for controlling a temperature of the metal hydride in the tank;

first control means for controlling an amount of heating medium introduced into the heat exchange device so that a desired amount of hydrogen gas is generated from the metal hydride in the tank;

a fuel supply conduit connecting the fuel tank with the internal combustion engine for introducing the hydrogen gas into the engine, and;

second control means for controlling an amount of hydrogen gas flowing in the fuel supply conduit so that a desired amount of hydrogen gas is introduced into the engine in accordance with an operating condition of the engine.

According to the present invention, the amount of heating medium fed to the heat exchange device is controlled so that a desired amount of hydrogen gas is generated in the fuel tank, and the amount of hydrogen gas is controlled such that a desired amount of hydrogen gas is introduced into the engine. As a result, a pressure regulator for controlling a predetermined pressure in the fuel supply conduit, enabling a desired amount of the hydrogen gas to be introduced into the engine, can be eliminated, and as a result, a required amount of hydrogen can be very quickly introduced into the engine, to thereby increase the speed of the response of the engine.

DESCRIPTION OF THE PREFERRED EMBODIMENTS

Figure 1:
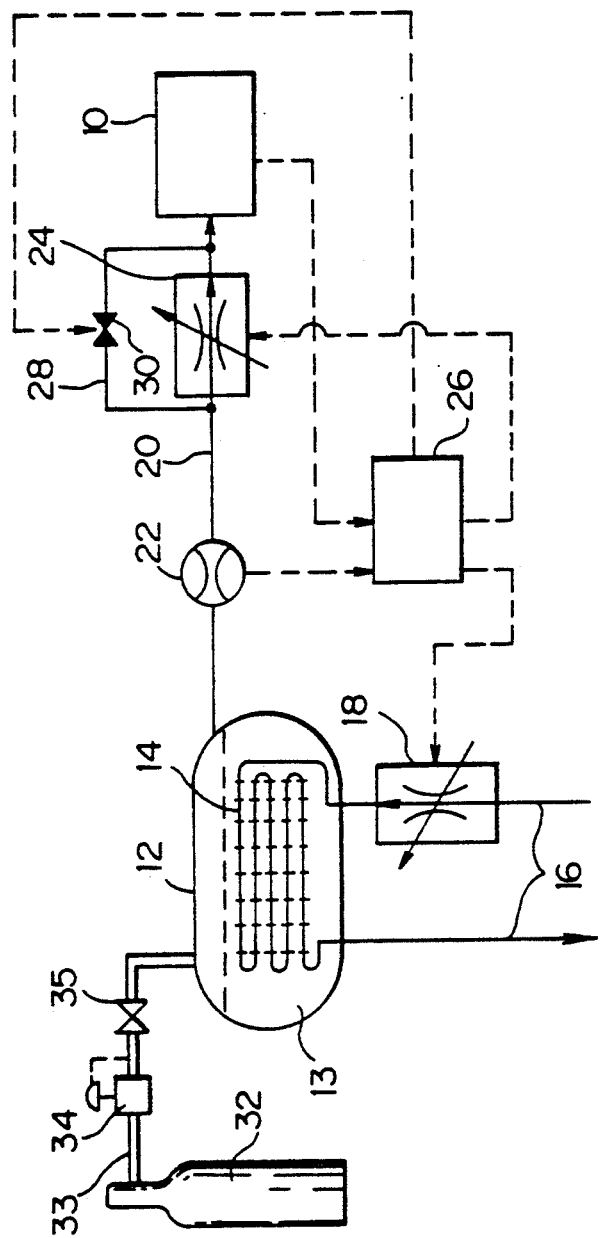
FIG. 1 is a schematic view of a fuel supply system for a hydrogen internal combustion engine according to the present invention.

In FIG. 1, showing a first embodiment of the present invention and illustrating the basic idea of the present invention, reference numeral 10 denotes an internal combustion engine, such as a spark ignition type engine, supplied with hydrogen gas as a fuel, and reference numeral 12 denotes a metal hydride tank containing pellets 13 made of an alloy able to absorb and store hydrogen, such as Ti-Fe. This tank 12 has a relatively low inner pressure, and therefore, is advantageous in that it does not require a high mechanical strength to maintain a sufficient safety, as required by a high pressure cylinder for storing liquid hydrogen. A heat exchange device 14 is arranged in the tank 12, for heating or cooling the metal hydride pellets 13 stored in the tank 12, and is composed of a heat exchange pipe, with fins, in which a recirculating flow of hot water from a water jacket (not shown) of the internal combustion engine is created.

Regarding the alloy for creating the metal hydride, Ni-La alloy or Ti-Mn alloy can be used instead of Ti-Fe alloy. These Ti-Fe, Ni-La, and Ti-Mn alloys are low temperature metal hydrides able to absorb or emit hydrogen gas at a low temperature in a range of between a normal temperature to about 100° C. Another group of alloys for creating the metal hydride is composed of high temperature metal hydrides able to absorb and emit hydrogen at a high temperature of between 300° to 400° C., and includes Mg-Ni and Mg-Mn alloys. According to this embodiment, in which the engine cooling water is used as a heating medium, preferably a low temperature metal hydride is employed.

The heat exchange device 14 is constructed by a serpentine pipe arranged in the metal hydride tank 12 such that the pipe is in contact with the metal hydride pellets 13 stored in the tank 12. The serpentine pipe is connected to an engine water conduit 16, for heating or cooling the metal hydride pellets 13 stored in the tank 12 via the heat exchange device 14. A water flow amount control valve 18 (FIG. 2) is mounted in the hot water conduit 16, for controlling the amount of heating or cooling water passed through the heat exchange device 14, to thereby control the amount of hydrogen gas discharged from the metal hydride pellets restored in the tank 12. The water conduit 16 is connected to an engine water conduit in such a manner that a part or all of the engine cooling water is made to by-pass a radiator (for heating) or an engine cooling water jacket (for cooling) by using a suitable switching valve (not shown). In a preferred case, a heat energy of the exhaust gas is recovered by the cooling water and the heated water is used for heating the pellets 13, or the exhaust gas itself is introduced into the heat exchange device 14 in the metal hydride tank 12, as a heating medium.

A conduit 20 is provided for a connection of the metal hydride tank 12 with the internal combustion engine 10, for introducing the hydrogen gas from the tank 12 to the engine 10. Unlike the prior art, the conduit 20 does not have with a pressure regulator for controlling the pressure of the hydrogen in the conduit 20 to a predetermined constant value. According to the present invention, a hydrogen flow meter 22 is arranged in the hydrogen supply conduit 20, for detecting the amount of the hydrogen gas supplied to the engine. Any known type of hydrogen gas flow meter can be employed, but a mass flow type is preferable to a volumetric flow type, in view of the fact that the hydrogen is highly sensitive to changes of temperature. Instead of a direct detection, the hydrogen gas flow amount may be calculated from a detected pressure and temperature of the hydrogen gas.

A flow control valve 24 is arranged in the fuel supply conduit 20, at a position downstream of the hydrogen flow meter 22, for controlling the amount of hydrogen gas introduced into the engine 10. The flow control valve 24 can be any type, including a solenoid operated type valve or pressure (vacuum pressure or positive pressure) operated type valve, able to respond to a control, electric signal for controlling the amount of hydrogen gas introduced into the engine 10 per unit of time. Furthermore, a single type of such a flow control valve may be used between different cylinders of the internal combustion engine, i.e., the valve is arranged in a portion of the intake conduit of the engine at which intake passageways (not shown in FIG. 1) from the respective cylinders of the engine are combined. Alternately, such flow control valves can be respectively arranged in the respective intake passageways to the respective cylinders of the internal combustion engine.

An electric control circuit 26, i.e., a microprocessors, is provided, to which the hydrogen flow meter 22 and sensors (not shown) arranged in the internal combustion engine input signals related to the flow amount of the hydrogen gas, and various signals indicating the operating conditions of the engine. The control circuit 26 stores a program for outputting signals to the water flow control valve 18 and hydrogen gas flow control valve 24 in accordance with operating conditions of the engine.

A by-pass pipe 28 is connected to the fuel supply conduit 20 so that it bypasses the hydrogen flow control valve 24, and an electromagnetic control valve 30 is mounted in the by-pass pipe 28. The electromagnetic valve 30 is connected to the control circuit 26, and is operated only when the precision of the control of the flow amount of the hydrogen gas is lost. Namely, the flow control operation by the hydrogen flow control valve 24 is assisted by the electromagnetic valve 30, to thus obtain a desired flow precision.

It should be noted that the water flow control valve 18, the hydrogen flow control valve 24, and the bypass valve 30 can be of any kind of construction, as long as they can be electrically operated by the control circuit 26. Namely, these valves may be an analogue type having a degree of opening continuously varied in accordance with a level of an electric signal applied thereto. Alternatively, the valves may be an ON-OFF type having opened and closed positions, and a duty control provided for obtaining a pulse signal applied thereto and obtaining a desired degree of opening determined by the duty ratio, which is a ratio of a duration of an ON condition with respect to a duration of one cycle of the pulse signal.

Now, the operation of the embodiment in FIG. 1 will be explained. In order to charge the tank 12 with hydrogen gas a high pressure container 32 holding liquid hydrogen is connected to the tank 12 via a hydrogen charging conduit 33. A pressure regulator 34 for reducing the pressure of the hydrogen gas, and a stopper valve 35 for allowing the introduction of the hydrogen gas when required, are provided in the conduit 33. As a result, the hydrogen gas from the container is introduced into the tank 12, while the tank 12 is cooled by the heat exchange device 14 through which a cooling medium is passed, and accordingly, a large amount of hydrogen gas introduced into the tank can be absorbed by the hydrogen absorbing and storing alloy pellets stored in the tank 12 in the metal hydride state. After the absorbing and storing process is completed, the stopper valve 35 is closed and the conduit 33 is disconnected from the tank 12.

During the operation of the engine 10, a flow of hot water from the water jacket or top tank of a radiator of the engine is created in the heat exchange device 14, whereby the hydrogen gas is separated from the hydrogen absorbing and storing alloy 13 stored in the tank 12. The amount of the hydrogen gas obtained depends on the total amount of heat applied from the heat exchange device 14, which in turn is controlled by the degree of opening of the water flow control valve 18. The thus generated hydrogen gas is introduced into the engine via the conduit 20. The amount of hydrogen flowing in the conduit 20 is detected by the hydrogen gas flow meter 22, and is controlled by the hydrogen flow control valve 24 connected to the control circuit 26, so that a desired amount of the gas is introduced into the engine via a fuel supply means (not shown), such as fuel injection valves. The hydrogen gas introduced into the engine 10 is mixed with an intake air, to produce an air-hydrogen mixture which is combusted to provide an engine power.

Since the hydrogen has a very small density, compared with gasoline, a volumetric amount of the fuel in the hydrogen gas engine is much larger than that of a gasoline engine. According to the invention, no provision is made in the hydrogen gas supply conduit 20 for any means, such as a pressure regulator, able to provide a large flow resistance to the flow of the hydrogen gas, and as a result, according to the present invention, only a very limited pressure loss is created across the entire fuel supply system from the tank 12 to the engine 10, and thus the engine can quickly respond to a very rapid acceleration or deceleration operation because a desired amount of hydrogen gas is always supplied to the engine.

Namely, the pressure regulator device mounted in the hydrogen gas supply conduit 20 in the prior art inevitably causes a delayed response to be created in the system, and thus a necessary amount of hydrogen gas cannot be quickly supplied to the engine during an acceleration or deceleration condition. Contrary to this, the present invention eliminates the pressure regulator in the hydrogen gas supply conduit 20, to thus prevent the occurrence of a pressure drop, and thus very quickly supplies a desired amount of hydrogen gas to the engine 10. Furthermore, according to the present invention, a feedback system is provided for controlling the gas control valve 24 so that a desired amount of the hydrogen gas as detected by the sensor 22 is obtained, and the hot water amount control valve 18 is controlled for introducing a desired amount of hot water into the heat exchange device 14 in the tank 12, so that a desired amount of hydrogen gas is generated in the tank 12. As a result, a desired large amount of hydrogen gas is always quickly supplied to the engine, even if the engine is in a transient state such as an acceleration condition.

Figure 2:
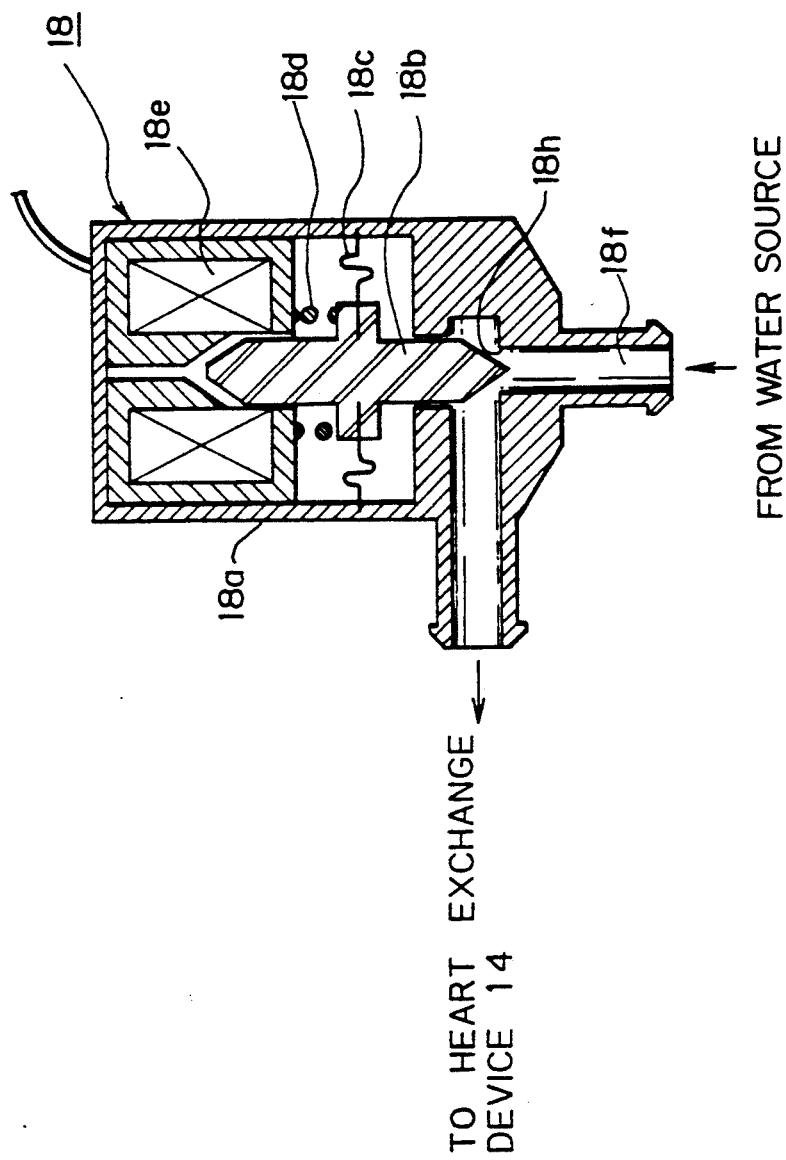
FIG. 2 is a cross sectional view of a hot water control valve shown in FIG. 1.

FIG. 2 illustrates an example of an actual construction of the water flow control valve 18, which is composed of a casing 18a, a valve member 18b made of a magnetic material and arranged in the casing 18a, a diaphragm 18c for supporting the valve member 18b, a spring 18d urging the valve member 18b toward the closed position thereof, and a solenoid 18e for generating an electromagnetic force for moving the valve member against the force of the spring 18d. The casing 18a has an inlet port 18f connected to a hot water source, and an outlet port 18g connected to the heat exchange device 14.

The solenoid 18e is connected to the control circuit 26 (FIG. 1), which generates a signal for controlling the electric current in the solenoid 18e, and the lift of the valve member 18b from a valve seat 18h is controlled in accordance with the value of the electric current supplied. Namely, the amount of hot water introduced into the heat exchange device 14 is controlled in accordance with the electric current supplied.

The amount of hydrogen required by the engine 10 is determined by the engine operating condition, mainly the intake air amount per engine rotation, and therefore, it is sufficient if an amount of hydrogen gas matching the engine operating conditions is generated. Thus, during a steady state condition of the engine, the value of the electric current, which determines the temperature of the metal hydride, i.e., the amount of hydrogen gas generated, is basically controlled in accordance with the engine operating condition. Contrary to this, during a transient state of the engine, the control of the amount of the hot water passed through the valve 18 differs from that made in the steady state condition. Namely, during the acceleration, the amount of hot water is increased to be more than in the steady state condition, to thus obtain an increased amount of hydrogen gas. Contrary to this, during a deceleration, the amount of hot water is reduced compared to that in the steady state condition, to thus reduce the amount of hydrogen gas obtained. Such a transient state can be detected from a rate of change in the degree of depression of the acceleration pedal, or a rate of change in the amount of hydrogen sensed by the gas flow meter 22. In place of the electric current control of the solenoid, a ratio of the duration of an ON time to the duration of one cycle of the pulse signal, i.e., a duty ratio, can be used for obtaining a continuously varied degree of opening of the valve 18.

As described above, in the first embodiment shown in FIGS. 1 and 2, no provision is made of a regulator for obtaining a predetermined pressure of the hydrogen at the tank 12, and therefore, a water amount control valve 18 is controlled in response to the amount of the hydrogen gas required. Such a control may cause fluctuations in the value of the pressure of the hydrogen gas at the tank 12, but is considered advantageous in that it increases the speed of the response of the system shown in FIGS. 1 and 2.

Figure 3:
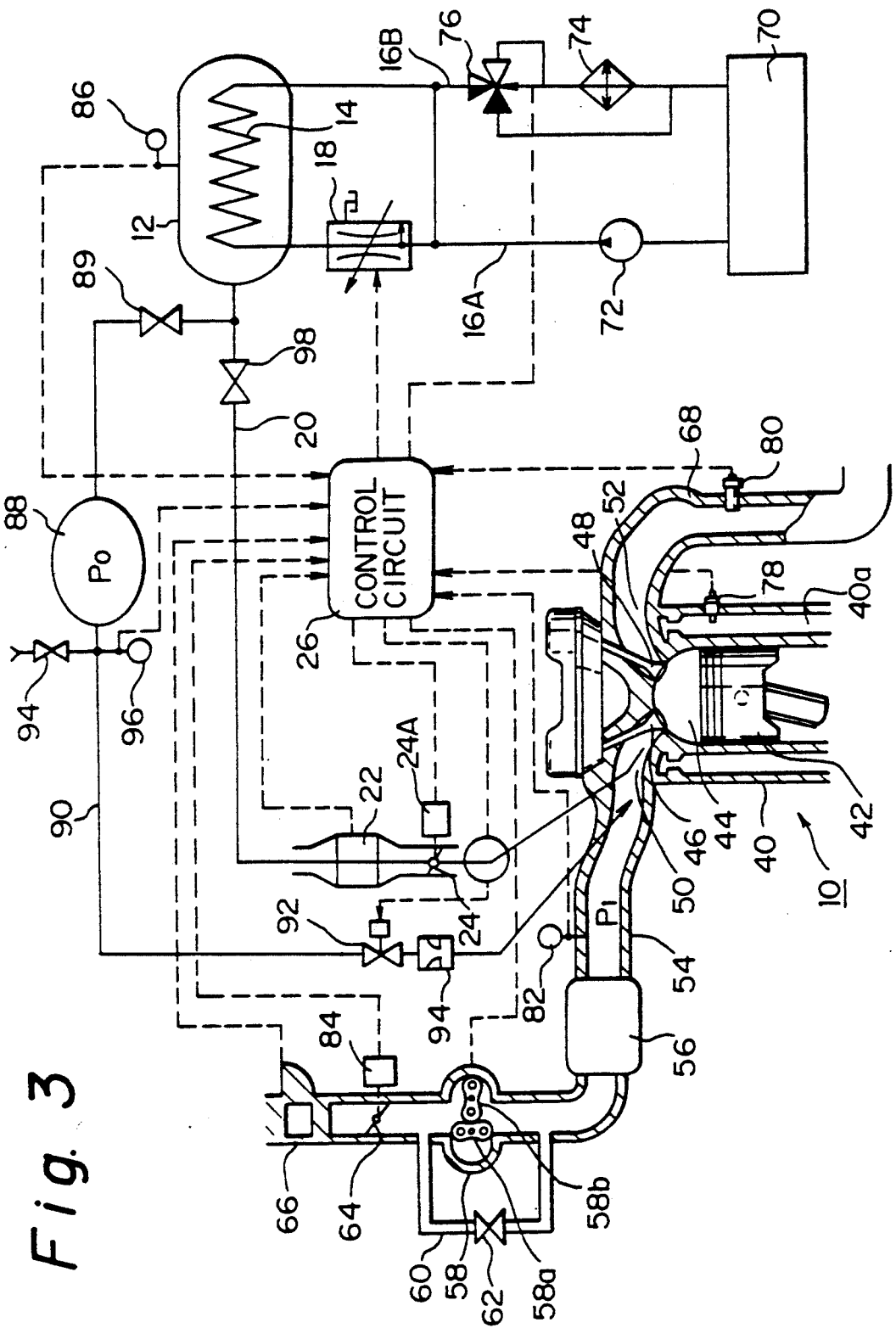
FIG. 3 is a schematic view of a fuel supply system as a second embodiment of the present invention.

FIG. 3 shows a second embodiment basically employing the concept of the present invention shown in FIG. 1 but modified for actual application to a supercharged fuel injection type internal combustion engine. The components corresponding to those shown in FIG. 1 are given the same reference numbers. The internal combustion engine 10 is a spark ignition type supplied with a hydrogen gas as a fuel. The engine 11 has an engine body 40 having cylinders (only one is shown in FIG. 3), each containing a piston 42 above which a combustion chamber 44 is formed. An intake valve 46 and an exhaust valve 48 are provided for each cylinder. When the intake valve 46 is opened a combustible mixture from an intake port 50 is introduced into the combustion chamber 44, and a resultant combustion gas is exhausted to an exhaust port 52 when the exhaust valve 48 is opened. The intake port 50 is connected to an intake manifold 54 connected, via an intercooler 56, to a supercharger 58 connected to a crankshaft (not shown). The supercharger 58 is, for example, constructed as a Roots pump having a pair of rotors 58a and 58b for generating a supercharged flow of intake air. The intercooler 56 cools the air from the supercharger 58 to thereby obtain a desired temperature of the intake air fed to the combustion chamber 44. A by-pass passageway 60 is connected to the intake conduit for bypassing the supercharger 58, and a by-pass control valve 62 is located in the by-pass passageway 60 for controlling the by-pass operation to thereby a desired pressure of intake air from the supercharger 58. A throttle valve 64 is connected to an accelerator pedal (not shown) and is arranged upstream of the super-charger 58. An air flow meter 66 is arranged upstream of the throttle valve 64, for measuring an amount of intake air introduced into the combustion chamber 44. The exhaust port 52 is connected to an exhaust manifold 68, for discharging the exhaust gas.

Similar to the first embodiment, the heat exchange device 14 formed as a serpentine pipe is arranged in the metal hydride tank 12 in which fine pellets or powders of a hydrogen absorbing and storing alloy are stored. The heat exchange device 14, is in contact with the pellets in the tank 12, and is connected to a source 70 of hot engine cooling water, such as an water jacket 40a in the engine body 40, via a hot water supply conduit 16A, which connects the hot water source 70 to the heat exchange device 14, for introducing the hot water into the heat exchange device 14, and via a hot water return conduit 16B, which connects the heat exchange device 14 with the hot water source 70, for returning the hot water to the source 70. A water pump 72 is arranged in the hot water supply conduit 16A, to provide a flow of hot water. A filter 74 is arranged in the hot water return conduit 16B, in which a three way switching valve 76 is also arranged for switching a return flow between a position at which the hot water passes the filter 74 and a position at which the hot water by-passes the filter 74. The hot water flow control valve 18 is arranged in the hot water supply passageway 16A at a position between the water pump 72 and the heat exchange device 14, for measuring the amount of hot water introduced into the heat exchange device 14.

Similar to the first embodiment, a supply conduit 20, not having a pressure regulator, is provided with a hydrogen flow meter 22 and a hydrogen flow control valve 24. The fuel supply conduit 20 is connected to the intake system via a fuel injection valve (not shown) for injecting hydrogen gas into the intake port 50 of the engine 10. In this embodiment, the flow control valve 24 is a butterfly type connected to an actuator 24A thereof.

An electronic control circuit 26 as a microprocessor is also provided, to which the hydrogen flow meter 22 and the air flow meter 66, and other sensors, input signals related to the flow amount of the hydrogen gas, and various signal indicating the operating conditions of the engine. These sensors are a temperature sensor 78 mounted on the engine body 40 for detecting a temperature of the engine cooling water, an $O_2$ sensor 80 mounted on the exhaust manifold 68 for detecting an oxygen density in the exhaust gas, a pressure sensor 82 mounted on the intake manifold 54 for detecting an intake air pressure, and a throttle sensor 84 for detecting a degree of opening of the throttle valve 64. The control circuit 26 is connected to the hot water flow control valve 18 and the actuator 24A of the hydrogen gas flow control valve 24 and has a stored program for executing the control supply of the amount of hot water to the heat exchange device 14 and the amount of hydrogen gas introduced into the engine 10.

In this second embodiment, unlike the first embodiment in FIGS. 1 and 2, provision is made for a control of the pressure in the tank 12 by a sensor 86 for detecting a pressure of the hydrogen gas in the tank, and the control circuit 26 operates, in response to the detected pressure, to control the water flow control valve 18 so that the hydrogen pressure inside the tank 12 is maintained at a desired value. This means that greater the amount of hydrogen gas consumed by the engine 10, the greater the amount of hot water introduced into the heat exchange device 14.

When the vehicle moves from a high load operating condition wherein a large amount of hydrogen gas is consumed to a stopped (dead soak) condition wherein the consumption of hydrogen gas is sharply reduced, the separation of the hydrogen gas from the metal hydride continues for a while due to heat generated by the hot water remaining in the tank 12, and the heat preserved by the tank 12 and the hydrogen absorbing-storing alloy itself, causing the pressure of the hydrogen to exceed the control pressure. To combat this problem, a second (sub) tank 88 is located in a second fuel supply conduit 90, and one end thereof is connected to the first fuel conduit 20 upstream of the hydrogen flow meter 22, and the other end is connected to the intake line adjacent to the intake port 50. A relief valve 89 is arranged in the second fuel conduit 90 upstream of the second tank 88, and a stopper valve 92 and a sonic nozzle 94 are arranged in the second fuel conduit 90 downstream of the second tank 88. Furthermore, a safety valve 94 is arranged in a conduit connected at one end to the second conduit 90 at a position adjacent to and downstream of the second tank 88, and having a second end opened to the atmosphere. A hydrogen pressure sensor 96 is also provided and is connected to the control circuit 26. Note, a fuel cut valve 98 is arranged in the first fuel conduit 22 downstream of the point of which the second fuel conduit 90 is connected to the first conduit 20.

As well known to those skilled in this art, the sonic nozzle 94 can emit a flow at a constant speed (sonic speed) when a pressure difference across the sonic nozzle 94 is smaller than a predetermined value. A constant pressure is detected from the pressure values detected by the sensor 82 for detecting the intake pressure in the intake manifold 54 and the sensor 96 for detecting the pressure at the outlet of the tank 88 (inlet to the sonic nozzle 94), and the stop valve 92, which is usually closed, is opened when the pressure ratio is lower than a predetermined value, whereby hydrogen gas in the second tank 88 is introduced into the intake manifold 54 of the internal combustion engine. Note, upon such an introduction of hydrogen gas from the sub-tank 88 to the intake manifold 54, a correction of a degree of opening of the hydrogen gas flow control valve 24 is carried out, to thus reduce the amount of hydrogen gas introduced into the engine via the main hydrogen gas conduit 20, so that the total gas amount supplied is unchanged.

Figure 4:
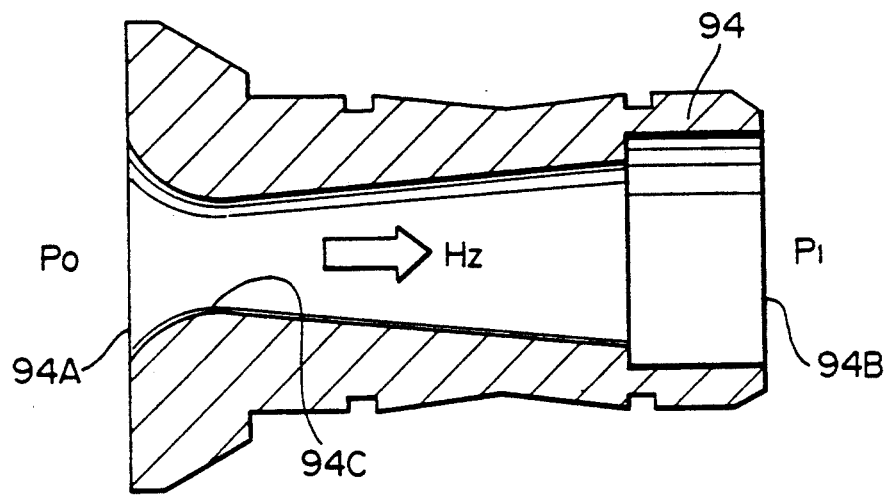
FIG. 4 is a cross sectional view of a sonic nozzle shown in FIG. 3.

Details of the construction of the sonic nozzle 94 will be explained with reference to FIGS. 3 and 4. FIG. 3 shows a basic construction of the sonic nozzle, and FIG. 4 shows a relationship between the pressure ratio of the output pressure $P_1$ to the inlet pressure $P_0$, and a hydrogen gas flow amount G passing through the sonic nozzle 94. The sonic nozzle 94 has an axial opening therethrough, and defining an inlet 94A and an outlet 94B. The inlet 94A is axially inwardly tapered toward a portion 94C having the smallest inner diameter, and the inner diameter of the axial opening then gradually widened toward the outlet end 94B. As easily seen from FIG. 4, a constant amount of air flow is obtained regardless of the value of the ratio $P_1/P_0$, when the value of the ratio is in a range (sonic area) wherein it is smaller than the maximum value $(P_1/P_0)_{MAX}$. As well known, in such an area, the speed of the air flow corresponds to the sonic speed. The dimension of the sonic nozzle 94 is such that an amount of hydrogen gas introduced into the intake manifold 54 is smaller than a predetermined amount, which is smaller than the amount of hydrogen gas necessary for carrying out an idling operation. Such a setting of the amount of the hydrogen gas via the sonic nozzle 94 makes it possible to use the sonic supply of the hydrogen gas throughout the whole engine operating area. Namely, the stopper valve 92 is opened when it is determined that the ratio of the pressure in the intake manifold sensed by the sensor 82 to the pressure sensed by the pressure sensor 96 is smaller than the predetermined value $(P_1/P_0)_{MAX}$, so that the hydrogen gas can pass through the sonic nozzle 94.

Figure 5:
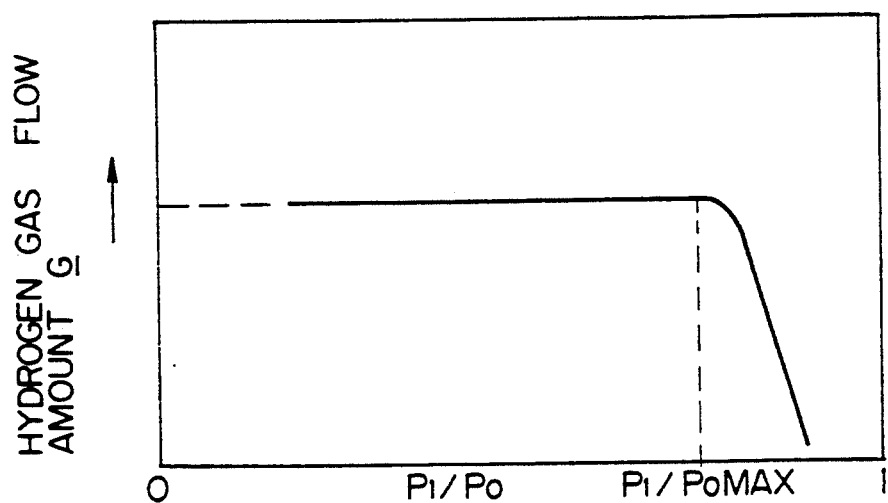
FIG. 5 shows a relationship between the pressure ratio and the flow amount passing through the sonic nozzle.
Figure 6:
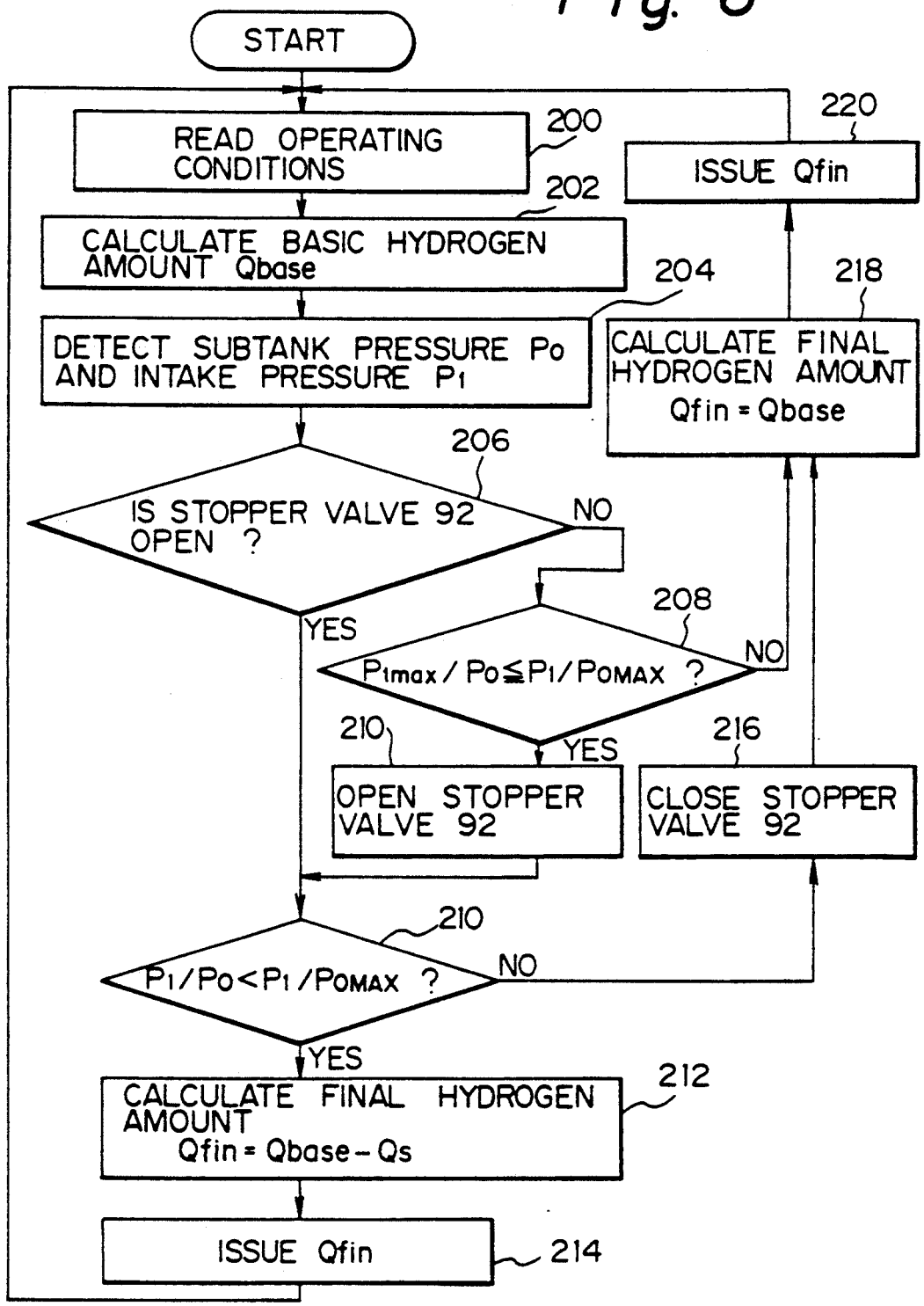
FIG. 6 is a flow chart illustrating the operation of the embodiment shown in FIG. 3.

FIG. 6 is a flowchart illustrating a control of the amount of hydrogen gas flow in the second embodiment in FIG. 3. After the initialization of the routine at step 200, various operating conditional signals are read from various sensors, such as the throttle sensor 84 and the intake pressure sensor 82, etc., and at step 202, a basic hydrogen gas amount $Q_{bass}$ is calculated based on the detected operating conditions. The basic hydrogen gas amount $Q_{BASE}$ is the amount of hydrogen gas required for obtaining a desired engine performance under the detected operating conditions. At step 204, a pressure $P_0$ at the sub-tank 88 sensed by the sensor 96 is read out, and at step 206, it is determined if the stopper valve 92 is closed. When it is determined that the stopper valve 92 is closed, the routine goes to step 208 and it is determined if the ratio of the maximum possible value of the intake pressure $P_{imax}$ to the pressure of the sub-tank $P_0$ is smaller than the maximum ratio $(P_1/P_0)_{MAX}$ in FIG. 5. When it is determined that $P_{1MAX}/P_0 > (P_1/P_0)_{MAX}$, the routine goes to step 210 and the stopper valve 92 is opened, and then the routine goes to step 211, and it is determined if the ratio of the actual value of the intake pressure $P_1$ to the pressure of the sub-tank $P_0$ is smaller than the maximum ratio $(P_1/P_0)_{MAX}$ in FIG. 5. When it is determined that $P_1/P_0 < (P_1/P_0)_{MAX}$, this means that ratio $P_1/P_0$ is in a range at which a sonic effect is provided to cause a flow of the hydrogen at a sonic speed as illustrated with reference to FIG. 5, the open state of the stopper valve 92 obtained at the step 210 is maintained, and the routine then goes to step 212, where a final amount of hydrogen gas flow $Q_{fin}$ is calculated as the basic hydrogen flow amount $Q_{base}$ minus the hydrogen gas flow amount $Q_s$ at the sonic nozzle 94. At step 214, a signal is output to the actuator 24A of the hydrogen flow control valve 24 so that the calculated final hydrogen flow amount $Q_{fin}$ as the basic amount $Q_{base}$ minus the amount $Q_s$ is injected into the intake port 50 via the injector (not shown).

When it is determined at step 210 that $P_1/P_0 \geq (P_1/P_0)_{MAX}$, this means that ratio $P_1/P_0$ is in a range at which the sonic effect cannot be provided (FIG. 5), and therefore, the routine goes to step 216 and the stopper valve 92 is closed, and to step 218, where a final amount of hydrogen gas flow $Q_{fin}$ is calculated as the basic hydrogen flow amount $Q_{base}$ itself. At step 220, a signal is output to the actuator 24A of the hydrogen flow control valve 24 so that the calculated final hydrogen flow amount $Q_{fin}$ as the basic amount $Q_{bass}$ itself is injected into the intake port 50 via the injector (not shown).

When it is determined at step 208 that the ratio of the maximum possible value of the intake pressure $P_{1max}$ to the pressure of the sub-tank $P_0$ is not smaller than the maximum ratio $(P_1/P_0)_{MAX}$ in FIG. 5, this means that it is theoretically impossible to obtain the sonic effect, and thus the routine goes to steps 218 and 220 and the basic amount $Q_{base}$ is injected while the stopper valve 92 is closed.

Figure 7:
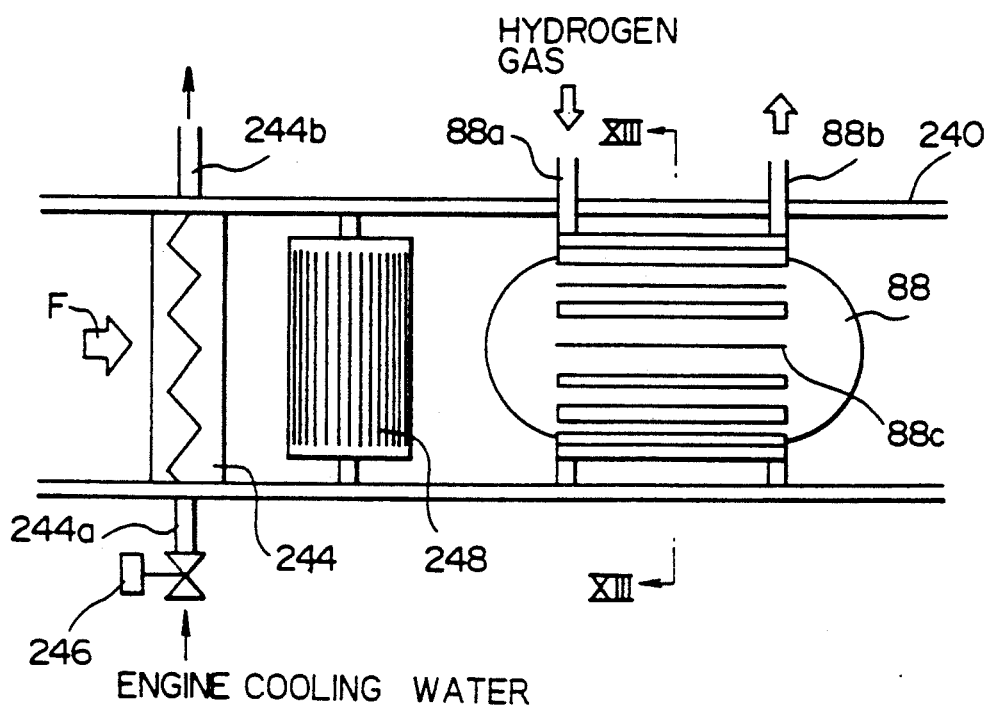
FIG. 7 shows a modification of a heating device for a sub tank.
Figure 8:
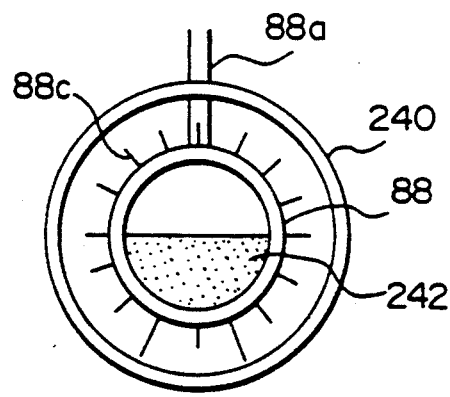
FIG. 8 is a cross sectional view tank taken along a line XIII—XIII in FIG. 7.

As mentioned above, the second embodiment ensures that the sonic effect via the sonic nozzle 94 is always obtained when introducing the hydrogen gas from the second tank 88 into the intake manifold 54 via the second hydrogen gas conduit 90, whereby excess hydrogen stored in the second tank 88 is effectively utilized. The removal of the hydrogen gas from the second tank 88, however, can cause a drop in the temperature of the metal hydride in the tank 88 due to the heat absorbing reaction occurring in the tank 88 when the hydrogen gas is removed therefrom. Such a fall in the temperature inside the tank 88 causes the pressure therein to be also reduced, and thus the reduced pressure drops out of the sonic area before the hydrogen in the second tank 88 is fully removed. Apart from this problem, when the hydrogen gas is taken out from the second tank 88, another problem arises when the excess hydrogen gas is introduced into the sub tank 88 from the main tank 12. Namely, the introduction of the excess hydrogen from the main tank 12 to the sub tank 88 causes a heat generating reaction in the sub tank 88, because the hydrogen gas is absorbed by the metal hydride stored in the sub tank 88, causing the temperature of the metal hydride to be increased, and accordingly, pressure inside the tank 88 to be raised above the permissible level. FIGS. 7 and 8 show a variation of a construction of a second tank by which this difficulty is overcome.

In FIG. 7, the sub tank 88 is arranged in a heater duct 240 in which an air flow is created. The sub tank 88 is provided with an inlet 88a for receiving hydrogen gas from the main tank 12, and an outlet 88b for the hydrogen gas to be introduced into the intake system of the engine 10 under the sonic effect, as explained above. The sub tank 88 is provided with outer wall heat exchange fins 88c in contact with the air flow in the heater duct 240. Note, the sub rank 88 contains pellets of a hydrogen absorbing-storing alloy 242, as shown in FIG. 8. In FIG. 7, a heater core 244 is arranged in the heater duct 240. This heater core 244 has an inlet 244a and an outlet 244b for the engine cooling water, and stopper valve 246 provided at the inlet 244a to the heater core 244. In the heater duct 240, a blower 248 is arranged between the heater core 244 and the sub tank 88 for generating a forced flow of the air from the outside of the vehicle, as shown by an arrow F.

Figure 9:
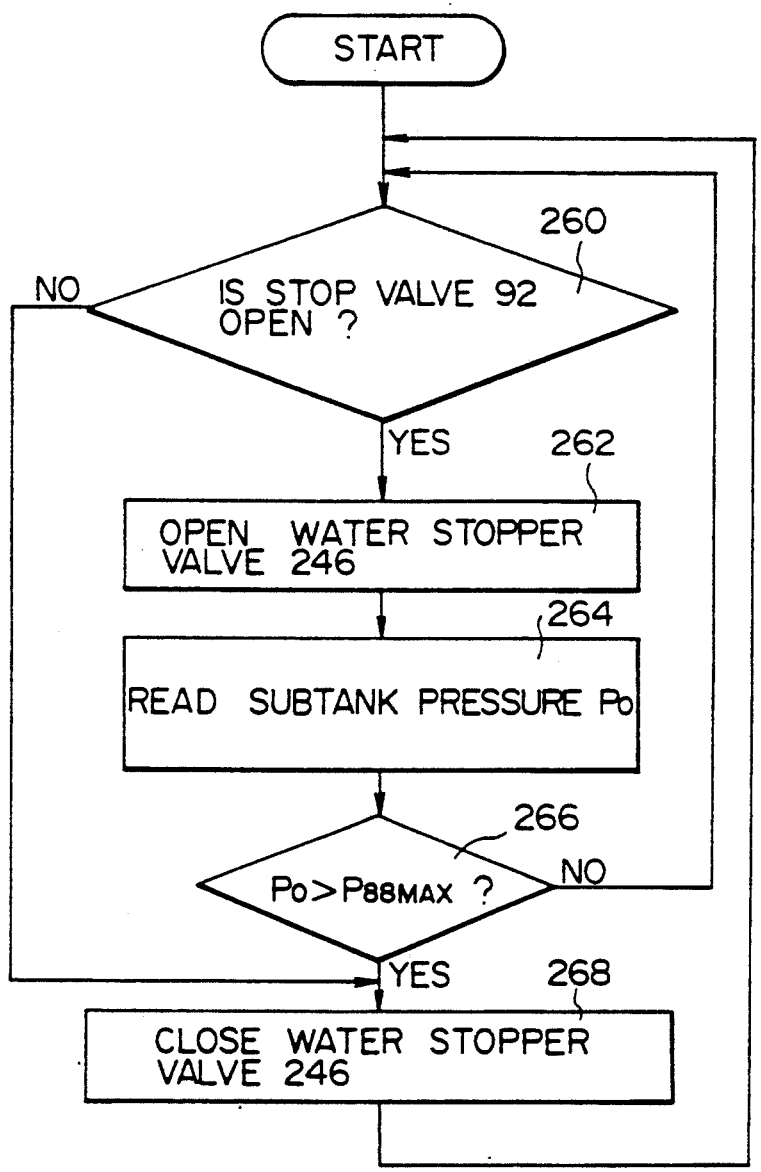
FIG. 9 is a flow chart illustrating the heating operation of the sub tank shown in FIG. 8.

FIG. 9 is a flowchart illustrating the operation of the system shown in FIG. 7. At step 260 it is determined whether the first stopper valve 92 in the sonic supply line 90 is open. When it is determined that the stopper valve 92 is open, i.e., an introduction of hydrogen gas under the sonic effect is being carried out, the routine goes to step 262 and the water supply stopper valve 246 is opened whereby the hot, engine cooling water from the engine 10 is introduced into the heater core 244, and thus the blower 248 generates a flow high temperature air in contact with the sub tank 88, to thereby heat the sub tank 88, and as a result, the metal hydride pellets 242 stored in the tank 33 generate hydrogen gas. At step 264, a pressure $P_0$ of the hydrogen gas in the sub tank 88 is detected by the pressure sensor 96 in FIG. 3, and at step 266 it is determined whether the detected value of the pressure $P_0$ is larger than a predetermined pressure $P_{88MAX}$. When it is determined that $P_0 > P_{88MAX}$, the routine goes to step 268 and the stopper valve 246 is closed, whereby the introduction of hot water into the heater core 244 is stopped, and accordingly, the temperature of the air in contact with the sub tank 88 is lowered to thus cause a separation of the hydrogen gas from the metal hydride pellets, resulting in a reduction in the pressure of the hydrogen gas in the sub tank 88. When it is determined at step 266 that $P_0 \leq P_{88MAX}$, as a result of the reduction of the hydrogen gas pressure, step 268 is by-passed and the stopping valve 246 is opened to allow an introduction of hot water into the heater core 244.

When it is determined at step 260 that the stop valve 92 is closed, i.e., the sonic introduction operation is not carried out, and the routine goes directly to step 268 to close the hot water stopper valve 246 and prevent an introduction of hot water into the heater core 244. As a result, the temperature of the air in contact with the sub tank 88 is lowered, and thus the pressure of the hydrogen gas therein is also lowered, and as a result, a greater absorption of the hydrogen gas to the metal hydride 242 in the sub tank 88 occurs.

Namely, in the embodiment of FIG. 7, the sub tank 88 is heated by the hot air flow when the hydrogen is taken out from the sub tank 88, so that as much as possible of the hydrogen in the sub tank 88 is consumed, and the sub tank 88 is cooled by the cooled air flow for absorbing as much as possible of the hydrogen gas from the main tank 12, when the hydrogen is not taken out from the sub tank 88. As a result, a storage of excess hydrogen from the main tank 12 and a desired consumption of hydrogen gas are effectively attained. Furthermore, this embodiment makes it possible to obtain an increased maximum amount generated hydrogen gas, to thus increase the output power of the hydrogen gas engine. Also, the excess amount of hydrogen gas generated in the metal hydride tank cannot leak to the atmosphere, and thus this system is much safer than a conventional system. Furthermore, this embodiment allows an effective use of excess air, causing the distance covered to be increased. The employment of the sonic nozzle 94 makes it easy to precisely measure the flow amount, and simplifies the measurement construction.

The principle shown in the embodiments in FIGS. 3 and 7 can be applied to a usual gasoline engine if it has construction corresponding to the embodiments in FIGS. 3 and 7. Namely, the first tank 12 will be a usual tank used in the construction of an internal combustion engine fuel system, and the second chamber 88 will be a charcoal canister usually used for storing gasoline vapor from the gasoline tank. After a condition is obtained for purging the gasoline held by the charcoal canister, the sonic nozzle 94 is operated to allow the charcoal canister to separate the required amount of gasoline, which is then introduced into the engine. An amount of gasoline introduced into the engine by a fuel injection valve will be reduced by the amount of the gasoline introduced into the engine via the sonic nozzle 94.

Figure 10:
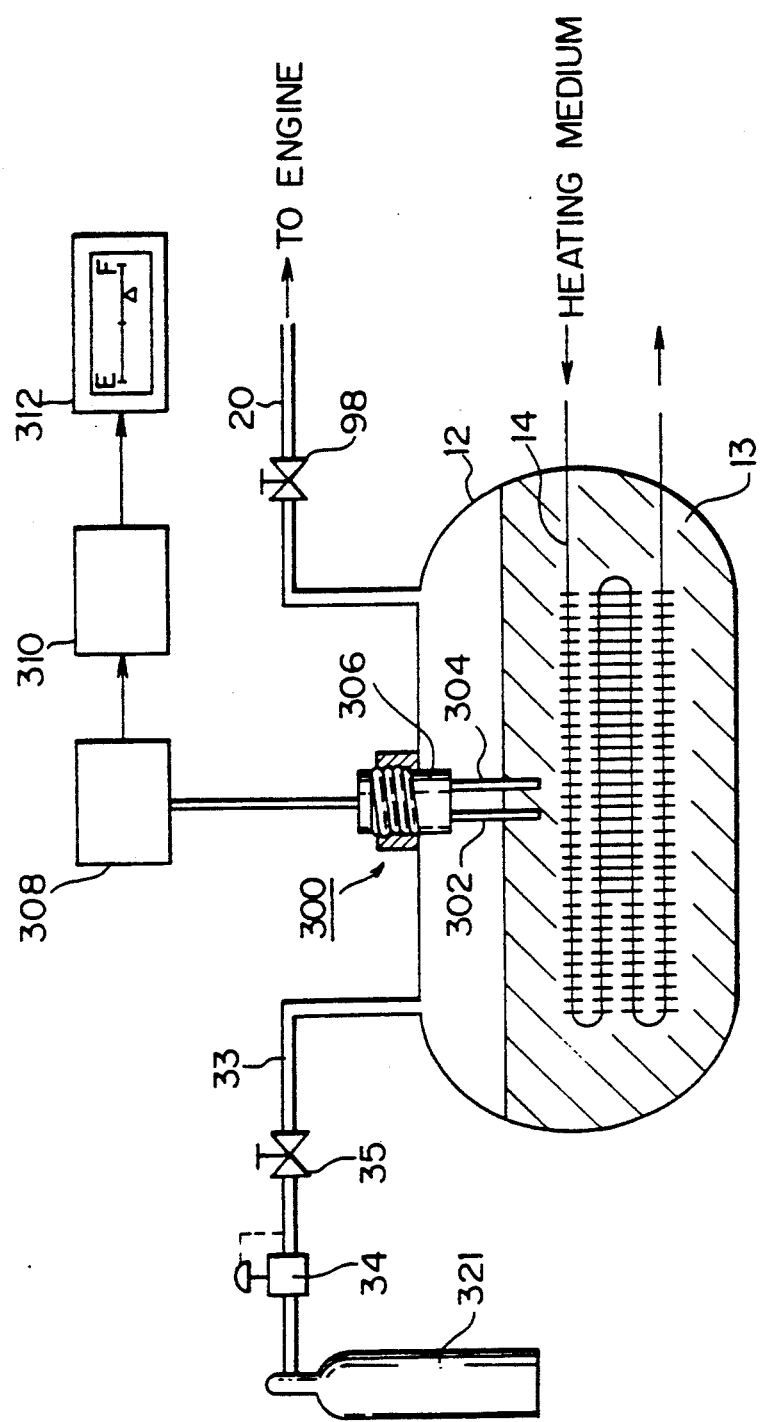
FIG. 10 shows another embodiment of the present invention, including a device for detecting an amount of fuel remaining in the tank.

In the embodiment in FIG. 10, an electrostatic sensor 300 for detecting an amount of hydrogen remaining in the metal hydride tank 12 is provided, in which the metal hydride 13 as fine pellets or powder is stored so that it occupies about 80 percent of the total space of the tank 12. The heat exchange device 14, through which a high temperature engine cooling water is passed, is located in the body of the metal hydride 13. The hydrogen gas conduit 20 is connected at one end to the tank 12 and is connected at the other end to the intake manifold to the internal combustion engine 10. The electrostatic sensor 300 is located at the top wall of the tank 12, and has a pair of electrodes 302 and 304 extending vertically downward so that tip ends of the electrodes 302 and 304 are penetrated into the body of the metal hydride powder 13 for at least 10 percent of their length, even when no hydrogen is charged. Since the metal hydride 13 has an electric conductivity, the electrodes 302 and 304 are provided with a non conductive coating on the entire outer surface thereof. The sensor 300 is further provided with a holder 306 for the electrodes 302 and 304; the holder 306 being sealingly connected to the top wall of the tank 12 by a screw member or a flange member. The electrodes 302 and 304 are connected to a circuit 308 for detecting an electrostatic charge, which is connected to a circuit 310 for converting the electrostatic charge detected by the circuit 308 to an amount of hydrogen gas remaining in the tank 12, and to a indicator 312 mounted on a dashboard for indicating the amount of remaining hydrogen calculated by the circuit 310.

Figure 11:
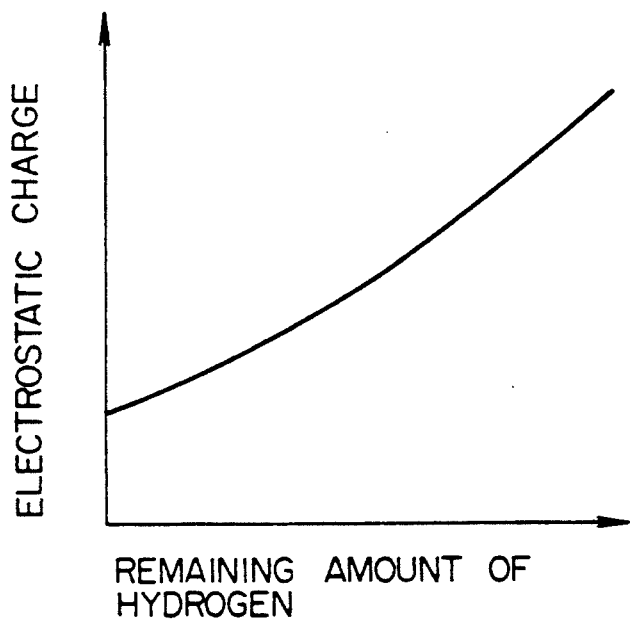
FIG. 11 shows a relationship between an electrostatic charge and the remaining amount of hydrogen gas.

As explained with reference to FIG. 1, during the charging of the tank 12 before the vehicle is run, the hydrogen gas from the high pressure container 32 is introduced into the tank 12 while the pellets in the tank are cooled by the heat exchange device 14, to thereby cause the alloy pellets to absorb the hydrogen gas and become a metal hydride. This absorption of the hydrogen gas causes the volume of the pellets 13 to be expanded and, accordingly, a rise in the upper level of the pellets. Such an expansion in the volume of the pellets 13 in the tank 12 causes an increase in the electrostatic charge detected by the pair of electrodes, and such a change in the electrostatic charge is detected by the circuit 308 and is converted into an amount of hydrogen gas remaining in the tank 12, by the circuit 310, based on the relationship shown in FIG. 11. The indicator 312 visually shows the calculated amount of hydrogen remaining in the tank 12.

During the running of the vehicle, the hydrogen gas generated by the pellets in the tank 12, by a heating of the tank 12, is consumed by the engine 10. The more hydrogen gas consumed, the greater the reduction in the volume of the pellets in the tank 12, whereby the upper level of the pellets 13 in the tank 12 is lowered, and thus an amount of the electrostatic charge between the pair of the electrodes is reduced. This reduction in the amount of hydrogen remaining in the tank 12 is indicated by the indicator 312.

The size of the pellets 13 also is meritably reduced by deterioration after prolonged use, and thus the volume thereof in the tank 12 may vary. To compensate for such a reduction in the size of the pellets after prolonged use, each time the tank 12 undergoes a periodical maintenance, the pellets 13 are completely deaerated, and the circuit 310 may function such that the detected value of the instant electrostatic charge is used as an updated zero value of the hydrogen amount, allowing the amount of hydrogen gas remaining in the tank 12 to be precisely detected regardless of any change in the size of the pellets after prolonged use, due to deterioration.

The metal hydride powders 13 sometimes have a property such that they are easily attached to the surfaces of the electrodes 302 and 304. In this case, a small amount of the powders remains attached to the electrode 302 and 304, regardless of any lowering in the level of the metal hydride powders 13, which adversely affects a precise detection of the value by the electrostatic charge. To combat to this problem, the nonconductive coating on the electrodes 302 and 304 may be a material having a low friction coefficient, such as a fluorine-based resin.

An error in a measurement of the electrostatic charge may occur because, during the charging or removing of the hydrogen gas, the metal hydride powder 13 is scattered in the space in the tank. To prevent this, a silicone oil can be impregnated in the metal hydride powders, to avoid such a scattering.

Figure 12:
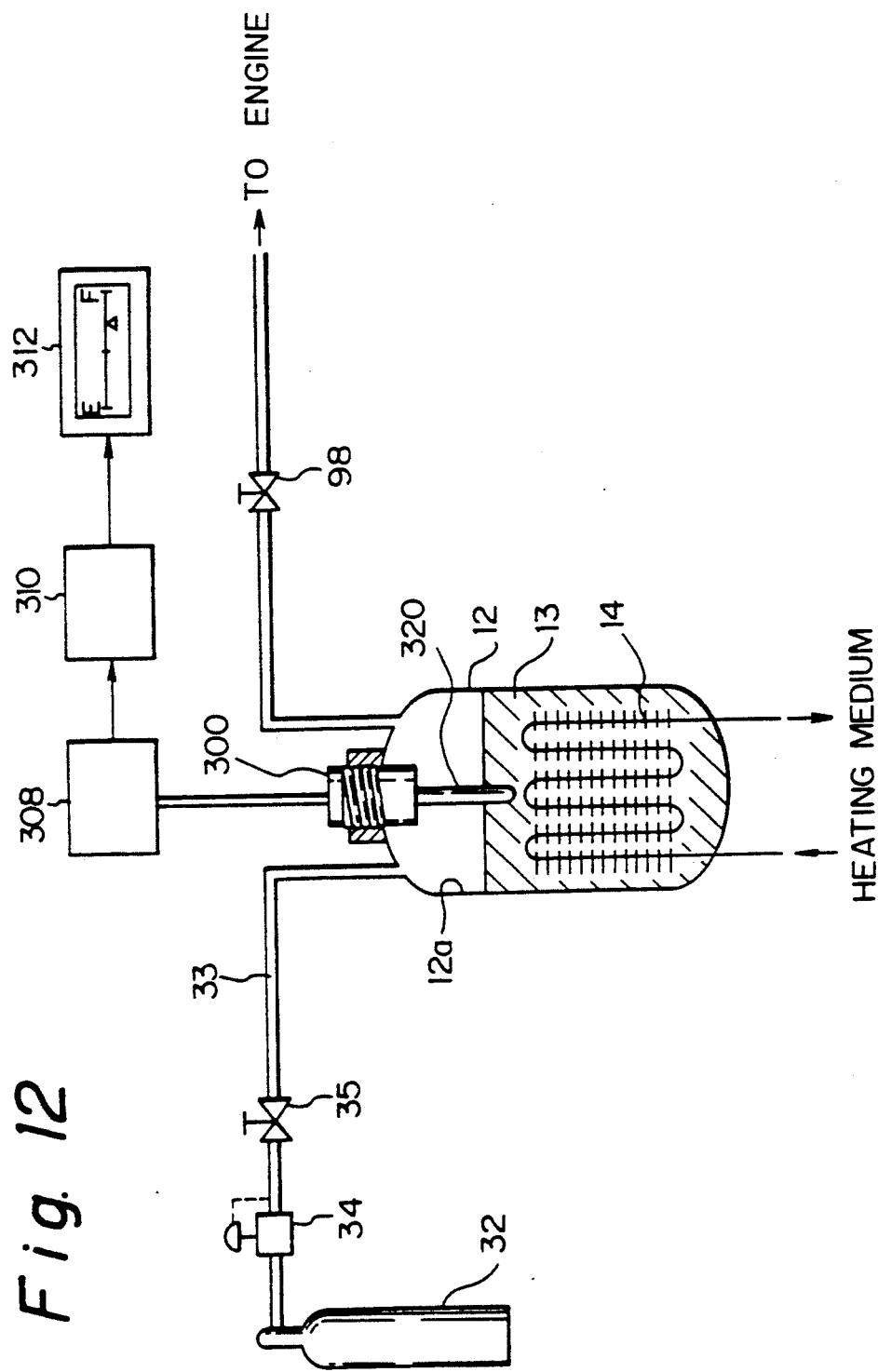
FIG. 12 is similar to FIG. 10 but is a modification thereof.

FIG. 12 shows a modification of the embodiment of the sensor for detecting an amount of hydrogen remaining in the tank 12. Instead of detecting an electrostatic change in the electrostatic change between the electrodes 302 and 304 in the embodiment in FIG. 10, a change in the electrostatic charge between a single electrode 320 and a wall 12a is detected, which has a coating made from an electric insulating material on the inner surface thereof in contact with the metal hydride powders, which has, per se an electric conductivity. This arrangement makes it possible to detect a change in the electrostatic charge between the electrode 320 and the wall 12a of the tank 12, which is caused by a change in the amount of hydrogen gas absorbed by the hydrogen absorbing-storing alloy.

Figure 14:
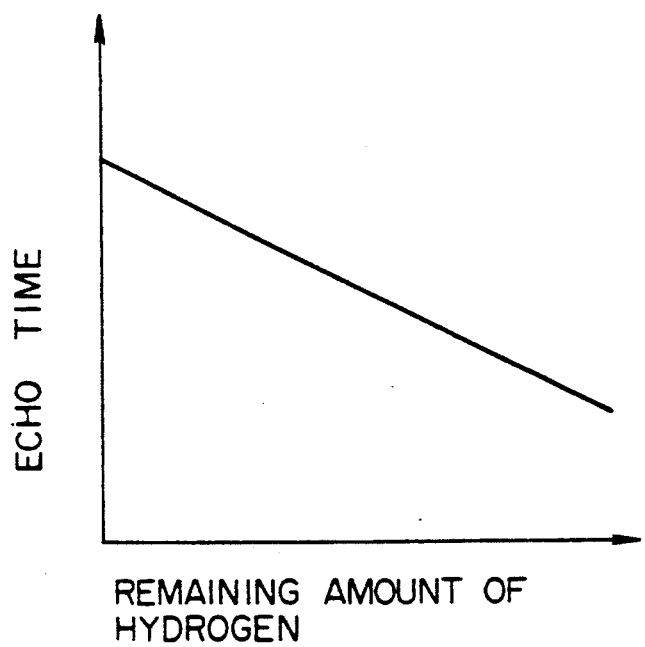
FIG. 14 shows a relationship between an echo time and the remaining amount of hydrogen gas.
Figure 13:
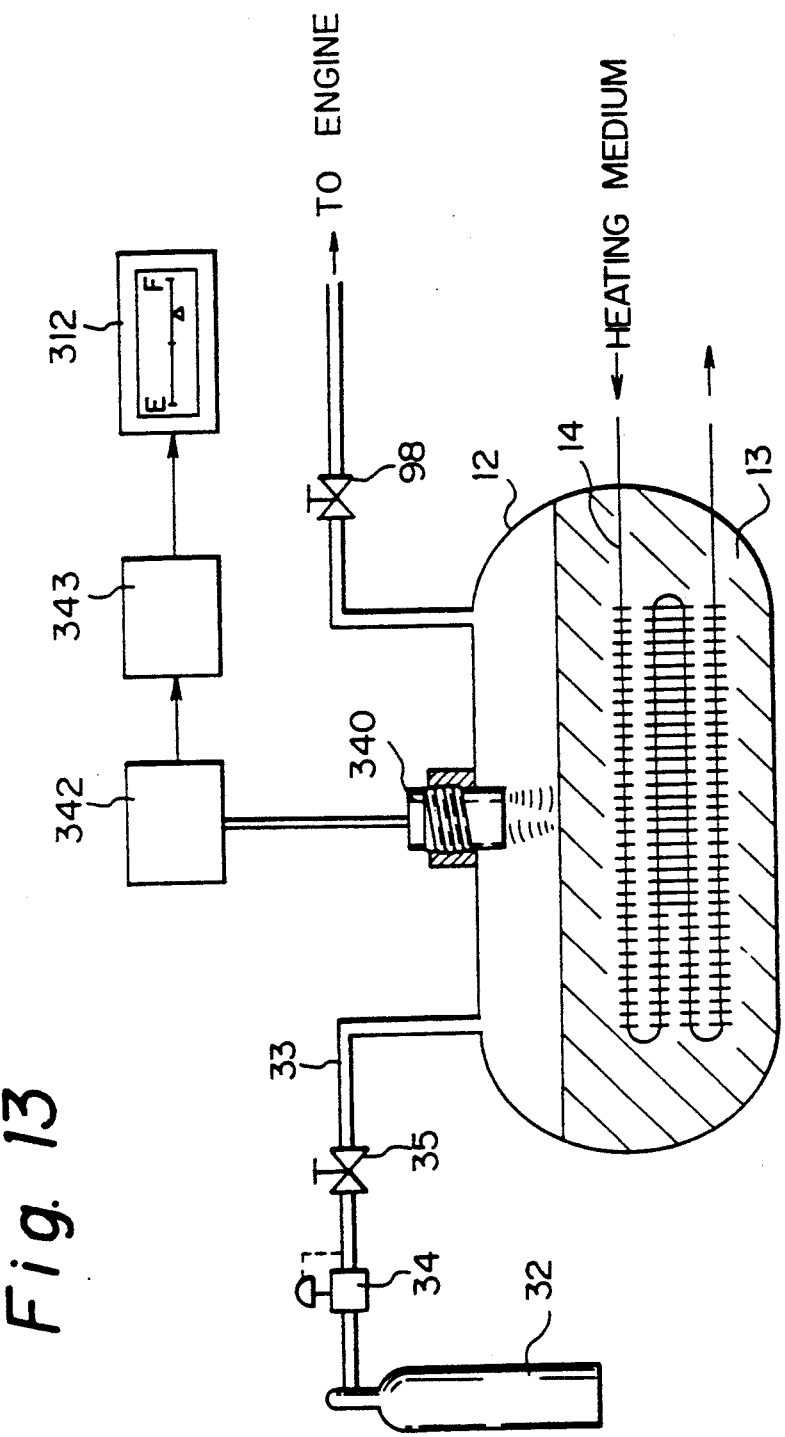
FIG. 13 shows another embodiment of the present invention, including a device for detecting an amount of fuel remaining in the tank, by using an ultrasonic wave.

FIG. 13 shows another embodiment for measuring the amount of hydrogen gas remaining in the tank 12. In place of a detection of the change in the electrostatic volume, an ultrasonic sensor 340 is provided for detecting the level of the metal hydride powders in the tank 12. The sensor 340 includes an emitter (not shown) of an ultrasonic wave toward the top level of the metal hydride powder 13 in the tank 12, and receiver (not shown) of the ultrasonic wave reflected by the top level of the metal hydride 13. A circuit 342 is provided for calculating the duration (echo time) from the emitting of the ultrasonic wave to the receiving of the reflected ultrasonic wave. A circuit 343 is also provided for calculating an amount of hydrogen remaining from a relationship between the echo time and the hydrogen remaining amount, as shown in FIG. 14. The calculated remaining hydrogen amount is indicated at the indicator 312. According to this embodiment in FIG. 13, the ultrasonic sensor 340 is a noncontact type, and therefore, an advantage is obtained in that an attachment of the metal hydride powders thereto does not occur, which may otherwise generate an error in measurement. Another advantage is that an expansion of the metal hydride in the tank 12 will not cause damage to the sensor due to a mechanical contact pressure applied thereto by the metal hydride in the tank.

Figure 15:
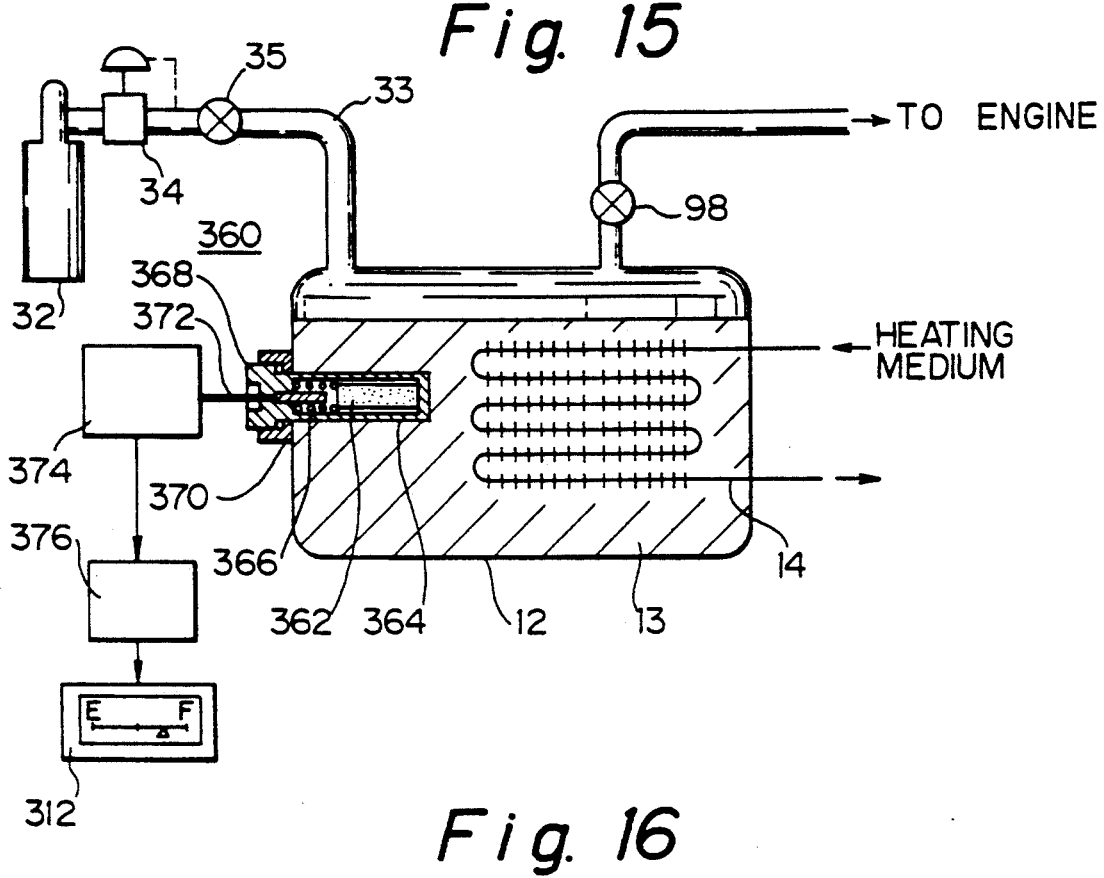
FIG. 15 shows another embodiment of the present invention, including a device for detecting an amount of fuel remaining in the tank, by an inductance.

FIG. 15 shows another embodiment of the sensor for measuring the amount of hydrogen gas remaining in the tank, by a change in the electric inductance. A sensor 360 includes a rod-shaped block 362 made of the same powder material as that of the metal hydride 13 in the tank 12, by shaping same in a mould under pressure.

Figure 16:
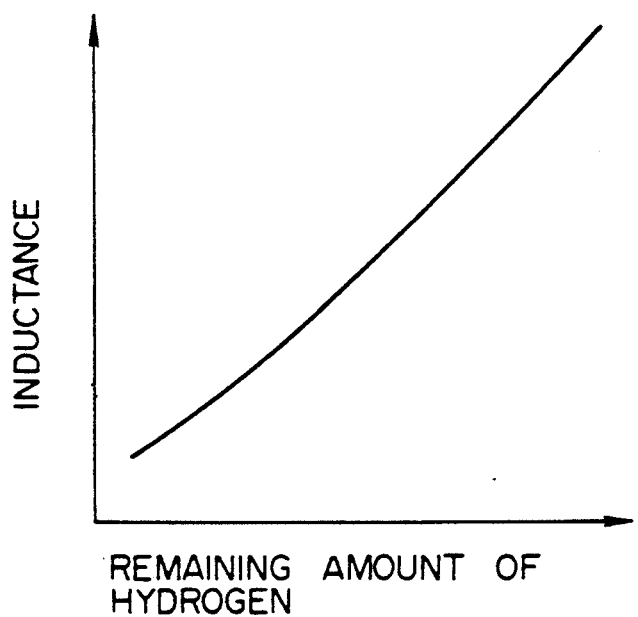
FIG. 16 shows a relationship between an inductance and the remaining amount of hydrogen gas.

The rod-shaped block 362 is fitted into a casing 364 having a closed bottom end, and a coil spring 366 is provided so that the block 362 is urged into contact with the closed bottom of the casing 364. The portion of the casing 364 with which the block 362 is in contact at the cylindrical thereof is a perforated material made, for example, by sintering a stainless steel material to provide a porous filter construction through which the hydrogen gas in the metal hydride 13 in the tank 12 can be freely introduced into the block 362 made of the same material (hydrogen absorbing and storing material) as the metal hydride 13. The outer end of the casing 364 has a cap portion 368 inserted to a socket portion 370 fixed to the outer wall of the tank 12, and a detecting member 372 is inserted into the cap portion 368 so that a free end thereof provided with a detecting coil faces the block 362 with a space therebetween. Note, seal members are arranged between the cap portion 368 and the socket 370, and between the cap portion 368 and the rod-shaped detecting member 372, to obtain a gas tight connection. A detecting circuit 374 is provided for generating a high frequency voltage applied to the coil portion in the rod member 370 facing the block 362, and a distance between the rod 370 and the block 362 is changed in accordance with the amount of the hydrogen gas in the tank 12, because the volume of the block 362 is changed in accordance with the volume of the metal hydride 13 in the tank, which corresponds to the amount of hydrogen in the tank 12. Such a change in the distance between the rod member 370 and the block 362 causes the inductance of the coil in the rod member 372 to be varied, which is changed into a direct current at the detecting circuit 374. A calculating circuit 376 calculates an amount of hydrogen gas remaining in the tank from the detected inductance, based on a relationship as shown in FIG. 16 between the value of the inductance and the amount of remaining hydrogen gas. The calculated amount of remaining hydrogen gas is indicated by the indicator 312.

The embodiments directed to the sensors shown in FIGS. 8 to 13 allow a detection of a hydrogen remaining amount of between 0% to 100%, in real time, and therefore, such a sensor, when used in relation to the tank as a fuel gauge, can always monitor the remaining amount of fuel, and thus prevent a running out of the fuel.

Figure 17:
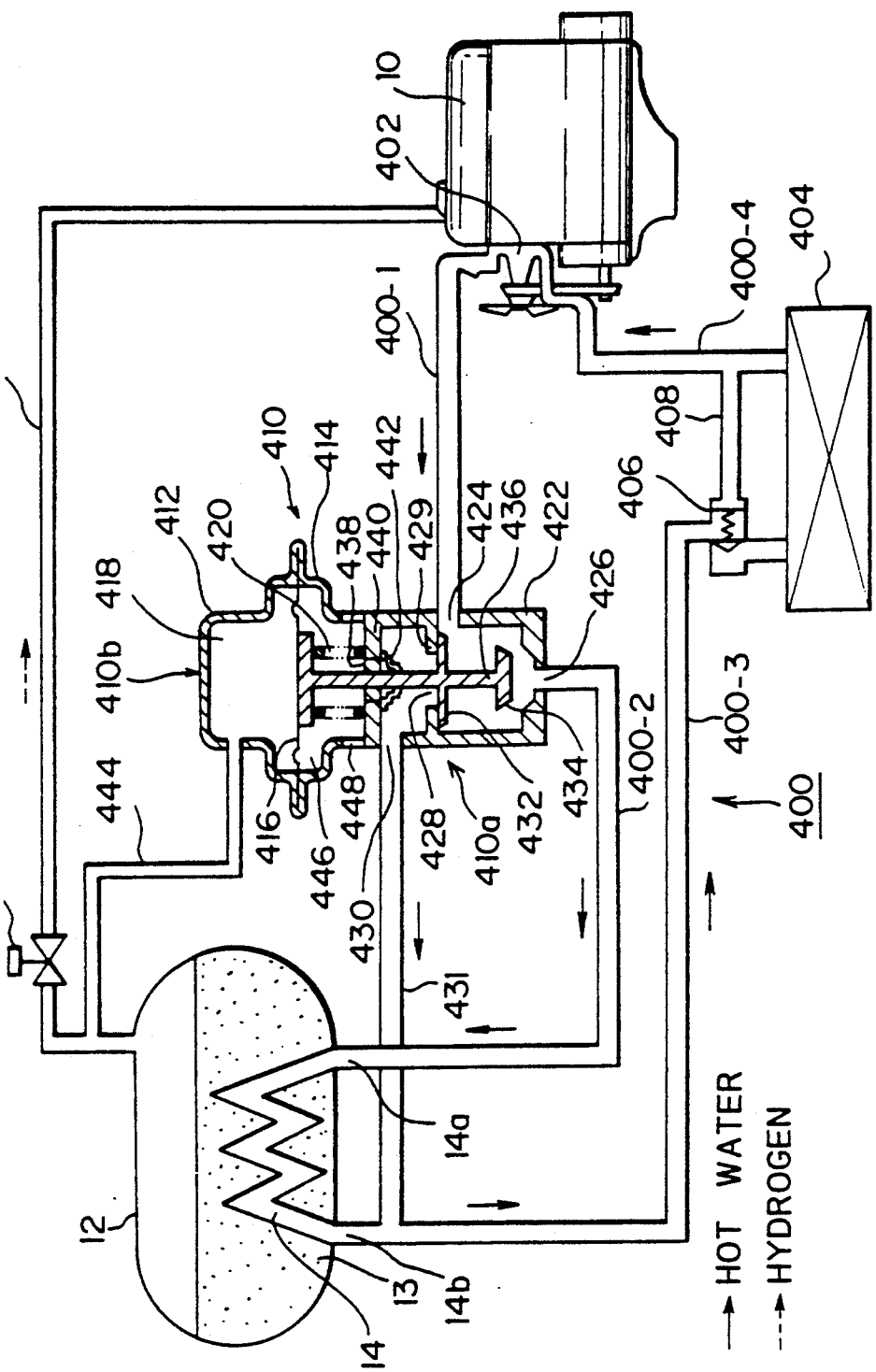
FIG. 17 shows another embodiment wherein a diaphragm valve responsive to a pressure in the tank is used for controlling the pressure in the tank, and an engine cooling water is used for heating the metal hydride in the tank.

FIG. 17 shows another embodiment wherein a pressure sensitive valve is used for controlling the introduction of hot water into the heat exchange device in the metal hydride tank, for controlling the generation of hydrogen gas therefrom. In this embodiment, the internal combustion engine is provided with a engine cooling system having a recirculation line 400 constructed by sections 400-1, 400-2, 400-3 and 400-4, a water pump 402 located in the line 400 for ensuring a recirculation of the cooling water in the line 400, a radiator 404 located between the sections 400-3 and 400-4 of the line 400 for obtaining a heat exchange of the cooling water with the outside air flow, and a thermostat 406 that is opened to obtain a flow of the cooling water through a by-pass line 408 by-passing the radiator 404, when the temperature of the cooling water is higher than a predetermined value. The heat exchange device 14 in the metal hydride tank 12, and in contacting with the metal hydride 13 in the tank 12, is connected, at one end 14a to the section 400-2 of the engine water recirculation line 400, and at the other end 14b is connected to the section 400-3 of the engine water recirculation line 400.

According to the embodiment of FIG. 17, a flow control valve 410 is provided, which is constructed by a flow control part 410a for controlling the amount of the engine cooling water in the line 400 and an actuator part 410b for operating the flow control section 410a in accordance with the pressure of the hydrogen in the tank 12. The actuator part 410b has a top diaphragm cover 412, a bottom diaphragm cover 414, a diaphragm 416 fixed between the covers 412 and 414, a pressure chamber 418 inside the top cover 412 above the diaphragm 416, and a spring 420 urging the diaphragm 416 upward. The flow control section 410a has a casing 422 defining an inlet port 424 connected to the section 400-1 of the line 400, for an introduction of the water from the engine 10, an outlet port 426 connected to the section 400-2 of the line 400 for a removal of the water toward the heat exchange device 14, valve ports 428 formed on a partition wall 429 of the casing, and by-pass port 430 connected to the section 400-3 of the line 400 via a by-pass conduit 431, a valve 432 for controlling the port 428, a valve 434 for controlling the port 426, and a valve stem 436 to which the valves 432 and 434 are fixedly connected. The valve stem 436 extends upward, and thus is slidable with respect to a valve guide 438 in a separating wall portion 440, and is connected to the diaphragm 416 so that the valve members 432 and 434 are moved together with the movement of the diaphragm 416. A rubber boot 442 is provided for sealing off engine cooling water running toward the valve guide 438. The pressure chamber 418 above the diaphragm 416 is connected, via a line 444, to a space above the level of the metal hydride 13 in the tank 12, and a chamber 446 which is connected to the atmosphere via an opening 448, is formed below the diaphragm 416.

The operation of the hydrogen engine causes the temperature of the cooling water in the cooling water line 400 to be higher than a predetermined value, e.g., 80° C., which causes the thermostat 406 to be switched to a position at which the engine cooling water is introduced into the radiator 404, to thereby lower the temperature of the engine cooling water. When the temperature is thus lowered below the predetermined value, the thermostat 406 is switched to a position at which the engine cooling water flows in the by-pass passageway 408, while by-passing the radiator 404, and as a result, the temperature of the engine cooling water is maintained at a substantially constant temperature of 80° C.

The consumption of the hydrogen gas in the metal hydride tank 12 causes the pressure therein to fall below a predetermined pressure, and accordingly, the spring 420 causes the diaphragm 416 to be displaced upward, so that the first valve 432 closes the valve port 428 and the second valve 434 opens the outlet port 426. As a result, the engine cooling water introduced into the valve 410 from the section 400-1 via the inlet port 424 flows into the section 400-2 via the outlet port 426. The cooling water is then introduced into the heat exchange device 14 in the tank 12, and returned to the engine via the section 400-3, the radiator 404 or by-pass pipe 408, and the section 400-4. The passage of the engine cooling water at substantially 80° C. is sufficient to heat the low temperature type metal hydride 13 stored in the tank 12, to thus generate hydrogen gas from the metal hydride tank 12, and as a result of this generation of hydrogen gas, the pressure inside the tank 12 is increased. The increase in the pressure inside tank 12 to a predetermined pressure causes the diaphragm 416 to be displaced downward against the force of the spring 420, and thus the first valve 432 opens the valve port 428 and the second valve 434 closes the outlet port 426. As a result, the engine cooling water introduced into the valve 410 from the section 400-1 via the inlet port 424 flows into the by-pass line 431 via the ports 428 and 430, and accordingly, the engine cooling water by-passes the heat exchange device 14 in the tank 12 and is returned to the engine via the section 400-3, the radiator 404 or by-pass pipe 408, and the section 400-4. The by-passing of the engine cooling water causes the temperature of the metal hydride 13 in the tank 12 to fall, and thus the generation of hydrogen gas from the metal hydride tank 12 is suppressed, and as a result, the pressure inside the tank 12 is lowered.

Namely, a pressure of hydrogen gas in the metal hydride tank 12 higher than a predetermined value causes the valve 410 to be closed to thereby stop the introduction of the engine cooling water to the heat exchange device 14, and a pressure of hydrogen gas in the metal hydride tank 12 lower than the predetermined value causes the valve 410 to be opened to allow the introduction of the engine cooling water to the heat exchange device 14. As a result, the control of the engine cooling water by the valve 410 maintains a predetermined pressure in the tank 12.

An advantage of this embodiment of FIG. 17 is that the construction for obtaining the predetermined pressure inside the tank 12 consists of only mechanical parts, and the electrically operated solenoid valve 18 as in the embodiment in FIGS. 1 and 3 and a relay(s) for operating the valve can be eliminated, which may otherwise generate electrical sparks which may accidentally ignite gas leaked from the tank or the gas supply line. Furthermore, an advantage of a very simple construction for controlling the metal hydride tank pressure can be obtained.

Figure 18:
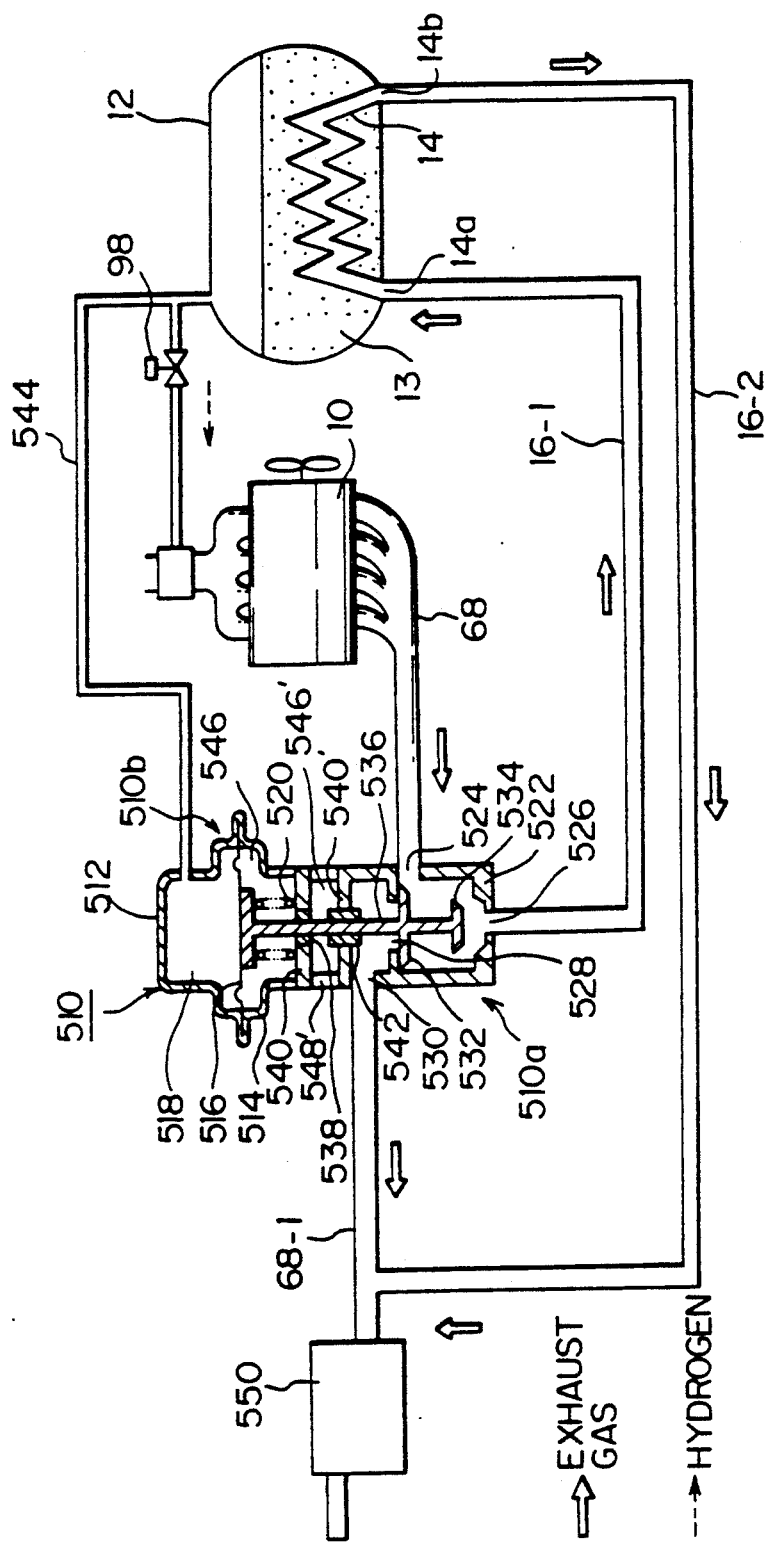
FIG. 18 is similar to FIG. 17 but differs therefrom in that an exhaust gas is used for heating the metal hydride in the tank; and, FIG. 19 is similar to FIG. 18 but differs therefrom in that the heat of the exhaust gas is used for heating a liquid medium that heats the metal hydride in the tank.

FIG. 18 is another embodiment obtaining a purely mechanical type construction for controlling the pressure in the tank. In this embodiment, in place of the heat from the engine cooling water a heat emitted from the exhaust gas of the engine 10 is used as the medium for heating the metal hydride 13 in the tank 12 by the heat exchange device 14. Namely, the low temperature type metal hydride employed in the embodiment in FIG. 17 can be made to generate enough heat for separating the hydrogen gas by using the engine cooling water at a temperature as low as 80° C., but, the low temperature of the engine cooling water is not sufficient to obtain a desired amount of hydrogen from the high temperature type metal hydride. The embodiment in FIG. 18 is directed to the use of such a high temperature type metal hydride. Here, a valve 510 is arranged in the exhaust pipe 68 of the engine for controlling the flow of the exhaust gas. The valve 510 is constructed by a flow control part 510a for controlling the flow amount of the exhaust gas, and an actuator part 510b for operating the flow control section 510a in accordance with the pressure of hydrogen in the tank 12. The actuator part 510b has a top diaphragm cover 512, a bottom diaphragm cover 514, a diaphragm 516 fixed between the covers 512 and 514, a pressure chamber 518 inside the top cover 512 above the diaphragm 516, and a spring 520 urging the diaphragm 516 upward. The flow control section 510a has a casing 522 defining an inlet port 524 connected to the exhaust manifold 68 for an introduction of the exhaust gas from the engine 10, a first outlet port 526 connected to a pipe 16-1 for introducing the exhaust gas to the inlet 14a of the heat exchange device 14, valve ports 528, and a second outlet port 530, which are connected to an exhaust pipe 68-1, a valve 532 for controlling the port 528, a valve 534 for controlling the port 526, and a valve stem 536 to which the valves 532 and 534 are fixedly connected. The valve stem 536 extends upward so that the valve stem 536 is slidable with respect to a valve guide 538 in a separating wall portion 540, and is connected to the diaphragm 516 so that the valve members 532 and 534 are moved together with the movement of the diaphragm 516. In place of the rubber boot 442 in FIG. 17, a seal member 542 having a sleeve shape is arranged on a partition wall 540', and a space 546' open to the atmosphere is created between the partition walls 540 and 540', in addition to a chamber 546 formed below the diaphragm 516, which chamber 546' is connected to the atmosphere via an opening 548'. A pressure chamber 518 is connected, via a line 544, to the space above the level of the metal hydride in the tank 12. Connected to the exhaust pipe 68-1 from the valve 510 at position upstream of a muffler 550 is a pipe 16-2 from the outlet 14b of the heat exchange device 14.

A reduction of a hydrogen pressure in the metal hydride tank 12 due to a consumption thereof causes the pressure in the chamber 518 to fall below a predetermined pressure, and thus the spring 520 causes the diaphragm 516 to be displaced upward so that the first valve 532 closes the valve port 528 and the second valve 534 opens the outlet port 526. As a result, an exhaust gas from the exhaust manifold 68 is directed to the pipe 16-1 via the port 524 and 526, and is introduced into the heat exchange device 14 via the pipe 16-1. After a heat exchange operation at the device 14 for heating the metal hydride 13 in the tank 12, the exhaust gas is directed to the muffler 550 via the pipe 16-2. The passage of the exhaust gas in the heat exchange device 14 can heat the high temperature type metal hydride 13 stored in the tank 12 to thus generate hydrogen gas in the metal hydride tank 12, and as a result of this generation of hydrogen gas, the pressure inside the tank 12 is increased. The increase in the pressure inside the tank 12 to a predetermined pressure causes the diaphragm 516 to be displaced downward against the force of the spring 520, so that the first valve 532 open the valve port 528 and the second valve 534 closes the outlet port 526. As a result, the exhaust gas from the exhaust pipe 68 is directed to the pipe 68-1 via the ports 528 and 530, and accordingly, the flow of exhaust gas by-passes the heat exchange device 14 in the tank 12. The by-passing of the exhaust gas causes the temperature of the metal hydride 13 in the tank 12 to fall to thus cause the generation of hydrogen gas from the metal hydride tank 12 to be suppressed, and as a result, the pressure inside the tank 12 is lowered.

Namely, a pressure of hydrogen gas in the metal hydride tank 12 higher than a predetermined value causes the valve 510 to be closed to thus stop the introduction of the exhaust gas to the heat exchange device 14, and a pressure of hydrogen gas in the metal hydride tank 12 lower than the predetermined value causes the valve 510 to be opened to allow the introduction of the exhaust gas to the heat exchange device 14. As a result, the control of the flow of the exhaust gas by the valve 510 always maintains a predetermined pressure in the tank 12.

Note, in the embodiment of FIG. 18, a chamber 546' is provided between the partitions 540 and 504', and is open to the atmosphere so that an air flow can freely pass through the chamber 546'. As a result, damage to the diaphragm 516 by the high temperature of the exhaust gas passing through the flow control portion 510b is prevented.

FIG. 19 shows another embodiment wherein the low temperature type metal hydride 13 is used, and the heat is obtained from the exhaust gas. The control valve 510 is substantially the same as that used in FIG. 18, and therefore, a detailed explanation thereof is omitted. In place of directing the exhaust gas to the heat exchange device 14, a passageway 600 is provided for connecting the first outlet port 526 of the valve 510 with the exhaust pipe 68-1, and a heat exchange device 602 is arranged in the passageway 600 for obtaining a heat exchange operation between the exhaust gas passing through the passageway 600 and a heating liquid, such as water, passing through the passageway 16 to the heat exchange device 14. A recirculation pump 604 is situated in the passageway 16 for ensuring the recirculation of the flow of heating liquid in the passageway 16.

A reduction of hydrogen pressure in the metal hydride tank 12 due to a consumption thereof causes the pressure in the chamber 518 to fall below a predetermined pressure, and thus the spring 520 causes the diaphragm 516 to be displaced upward so that the first valve 532 closes the valve port 528 and the second valve 534 opens the outlet port 526. As a result, an exhaust gas from the exhaust manifold 68 is directed to the pipe 68-1 via the port 524 and 526, which is introduced into the heat exchange passageway 600 and then enter the exhaust pipe 68-1. The passage of the high temperature of the exhaust gas via the heat exchange device 602 raises the temperature of the heating liquid recirculated in the passageway 16 and the increase in the temperature of the heat exchange medium in the passageway 16 causes arise in the temperature of the low temperature type metal hydride 13 stored in the tank 12, to thereby generate hydrogen gas in the metal hydride tank 12. As a result of the generation of the hydrogen gas, the pressure inside the tank 12 is increased, and an increase in the pressure inside the tank 12 to a predetermined pressure causes the diaphragm 516 to be displaced downward against the force of the spring 520, whereby the first valve 532 opens the valve port 528, and the second valve 534 closes the outlet port 526. As a result, the exhaust gas from the exhaust pipe 68 is directed to the pipe 68-1 via the ports 528 and 530, and accordingly, the exhaust gas by-passes the heat exchange device 602 in the passageway 600. The by-passing of the engine cooling water causes a drop in the temperature of the heat exchanging liquid in the passageway 16, and thus the temperature of the metal hydride 13 in the tank 12 is reduced, whereby the generation of hydrogen gas from the metal hydride tank 12 is suppressed, and as a result, the pressure inside the tank 12 is lowered.

According to this embodiment in FIG. 18, high temperature exhaust gas is used for a heat exchange with water used for heating the low temperature type metal hydride 13, for controlling the pressure in the tank 12.

In the embodiments of FIGS. 16 to 18, the flow control valve 410 or 510 is moved between a position at which one valve is open and the other valve is closed, and a position at which one valve is closed and the other valve is opened. Nevertheless, to increase the linearity of the control of the amount of heating medium, the valve 410 or 510 can be moved to an intermediate position between the above two extreme positions. Also, the diaphragm 416 or 516 can be directly connected to the wall of the tank 12, to thus control the flow of heating medium (engine cooling water or exhaust gas) in accordance with a difference between the force caused by the pressure of the hydrogen gas and the force of the spring 420 or 520. Furthermore, in place of the diaphragm 416 or 516, another type of pressure receiving member such as a piston can be used.

We claim:

1. A fuel supply system for an internal combustion engine, wherein a hydrogen gas is used as the fuel, the system comprising:
   a fuel tank in which a metal hydride is stored;
   a heat exchange device arranged in the fuel tank for controlling a temperature of the metal hydride in the tank;
   first control means for controlling an amount of heating medium introduced into the heat exchange device so that a desired amount of hydrogen gas is generated from the metal hydride in the tank;
   a fuel supply conduit connecting the fuel tank with the internal combustion engine for introducing the hydrogen gas into the engine; and
   second control means for controlling an amount of hydrogen gas flowing in the fuel supply conduit so that a desired amount of hydrogen gas is introduced into the engine in accordance with an operating condition of the engine, wherein the second control means comprises:
   sensor means for detecting an amount of hydrogen gas in the fuel supply conduit, and
   means for controlling the amount of hydrogen gas introduced to the engine so that a desired amount of the hydrogen gas detected by the sensor means is introduced into the engine.

2. A fuel supply system according to claim 1, wherein the first control means comprise means for detecting a pressure of the hydrogen gas in the tank, and valve means for controlling an amount of the heating medium introduced into the heat exchange means so that a desired amount of the heating medium is introduced into the heat exchange means for obtaining a predetermined pressure of the hydrogen inside the tank.

3. A fuel supply system for an internal combustion engine, wherein a hydrogen gas is used as the fuel, the system comprising:
   a fuel tank in which a metal hydride is stored;
   a heat exchange device arranged in the fuel tank for controlling a temperature of the metal hydride in the tank;
   first control means for controlling an amount heating medium introduced into the heat exchange device so that a desired amount of hydrogen gas is generated from the metal hydride in the tank, wherein the first control means comprises:
   sensor means for detecting an amount of the hydrogen gas introduced into the engine, and
   valve means for controlling an amount of the heating medium introduced into the heat exchange means in accordance with a detected amount of the hydrogen introduced into the engine so that a desired amount of the heating medium is introduced into the heat exchange means;
   a fuel supply conduit connecting the fuel tank with the internal combustion engine for introducing the hydrogen gas into the engine; and
   second control means for controlling an amount of hydrogen gas flowing in the fuel supply conduit so that a desired amount of hydrogen gas is introduced into the engine in accordance with an operating condition of the engine.

4. A fuel supply system according to claim 3, wherein the valve means comprises a valve member for controlling an amount of the heating medium introduced into the heat exchange device, and a solenoid means for obtaining a desired degree of opening of the valve member in accordance with an amount of hydrogen gas introduced into the engine.

5. A fuel supply system for an internal combustion engine, wherein a hydrogen gas is used as the fuel, the system comprising:
- a fuel tank in which a metal hydride is stored;
- a heat exchange device arranged in the fuel tank for controlling a temperature of the metal hydride in the tank;
- first control means for controlling an amount of heating medium introduced into the heat exchange device so that a desired amount of hydrogen gas is generated from the metal hydride in the tank;
- a fuel supply conduit connecting the fuel tank with the internal combustion engine for introducing the hydrogen gas into the engine, wherein no provision is made for a pressure regulator in the fuel supply conduit for obtaining a predetermined amount of the hydrogen; and
- second control means for controlling an amount of hydrogen gas flowing in the fuel supply conduit so that a desired amount of hydrogen gas is introduced into the engine in accordance with an operating condition of the engine.

6. A fuel supply system for an internal combustion engine, wherein a hydrogen gas is used as the fuel, the system comprising:
- a first fuel tank in which a metal hydride is stored;
- a heat exchange device arranged in the fuel tank for controlling a temperature of the metal hydride in the tank;
- first control means for controlling an amount of heating medium introduced into the heat exchange device so that a desired amount of hydrogen gas is generated from the metal hydride in the tank;
- a first fuel supply conduit connecting the first fuel tank with the internal combustion engine for introducing the hydrogen gas into the engine;
- a second fuel tank in which a metal hydride is stored;
- an auxiliary fuel supply conduit for connecting the first fuel supply conduit with the second tank;
- means arranged in the auxiliary fuel supply conduit for passing hydrogen gas from the first tank to the second tank when a pressure in the first tank exceeds a predetermined value;
- a second fuel supply conduit for connecting the second tank with the engine, providing a supplementary supply of fuel into the engine; and
- second control means for controlling a hydrogen gas flow amount through the first fuel supply conduit so that the amount of hydrogen gas passed through the first fuel supply conduit is compensated by an amount of hydrogen gas passed through the second fuel supply conduit.

7. A fuel supply system according to claim 6, further comprising a sonic nozzle arranged in the second fuel supply conduit, a stopper valve arrange in series to the sonic nozzle in the second fuel conduit, and stopping control means for opening the stopper valve when the sonic effect is obtained and closing the stopper valve when the sonic effect is not obtained.

8. A fuel supply system according to claim 7, wherein the stopping control means comprises means for detecting a pressure at the second fuel supply conduit at a position upstream of the sonic nozzle, and means for closing the stopper valve when the detected pressure in relation to an intake pressure is larger than a predetermined highest limit.

9. A fuel supply system according to claim 6, further comprising a heating means for heating the second fuel tank so that a desired temperature of the metal hydride in the second tank is maintained.

10. A fuel supply system according to claim 9, wherein said heating means comprise a duct in which an outside air flows, the second tank being arranged in the duct and in contact with the air flow, and a heater means arranged in the duct at a position upstream of the tank, for heating the air flow directed to the second tank.

11. A fuel supply system according to claim 10, wherein the heater means comprise a heater core through which an engine cooling water from the engine is passed, a stopper valve for controlling an introduction of the water to the heater core, a sensor for measuring a pressure in the second tank, and means for controlling the stopper means to thereby control the introduction of the water to the heater core and obtain a predetermined pressure inside the second tank.

12. A fuel supply system for an internal combustion engine, where a hydrogen gas is used as the fuel, the system comprising:
- a fuel tank in which a metal hydride is stored;
- a heat exchange device arranged in the fuel tank for controlling the temperature of the metal hydride in the tank;
- first control means for controlling the amount of heating medium introduced into the heat exchange device so that a desired amount of the hydrogen gas is generated from the metal hydride in the tank;
- a fuel supply conduit for connecting the fuel tank with the internal combustion engine for introducing the hydrogen gas into the engine;
- second control means for controlling a hydrogen gas flow amount in said fuel supply conduit so that a desired amount of the hydrogen gas is introduced into the engine in accordance with an operating condition of the engine;
- means for measuring a change in the volume of the metal hydride stored in the tank, and;
- means for calculating, from the detected change in the volume of the metal hydride, the amount of hydrogen gas remaining in the fuel tank.

13. A fuel supply system according to claim 12, wherein the means for measuring the volume change comprise a pair of spaced apart electrodes in contact with the metal hydride stored in the tank, the electrodes having nonconductive coatings on the surfaces in contact with the metal hydride, and means for detecting an electrostatic charge between the electrodes as indicative of the amount of hydrogen remaining.

14. A fuel supply system according to claim 13, wherein one of the pair of electrode is a wall of the tank.

15. A fuel supply system according to claim 13, wherein the nonconductive material has a low coefficient of friction.

16. A fuel supply system according to claim 15, wherein the material is a fluoride based resin.

17. A fuel supply system according to claim 12, wherein the metal hydride in the tank is impregnated by a silicone oil for preventing a scattering of the powder state metal hydride in the tank.

18. A fuel supply system according to claim 12, wherein the means for measuring the volume change comprise an ultrasonic wave emitter, a receiver of an ultrasonic wave reflected by the metal hydride in the tank, and means for calculating from a time difference between the emitting of the ultrasonic wave and the receiving of the reflected ultrasonic wave a distance to the top surface of the metal hydride in the tank as indicative of the amount of hydrogen remaining.

19. A fuel supply system according to claim 12, wherein the means for measuring the volume change comprise a perforated casing in which a metal hydride column is stored, a coil arranged so that it is spaced from the metal hydride in the perforated casing, means for applying a high frequency alternating electric current, and means for detecting an inductance of the coil as indicative of the amount of hydrogen remaining.

20. A fuel supply system for an internal combustion engine, where a hydrogen gas is used as the fuel, the system comprising:
   a fuel tank in which a metal hydride is stored;
   a heat exchange device arranged in the fuel tank for controlling the temperature of the metal hydride in the tank;
   a fuel supply conduit for connecting the fuel tank with the internal combustion engine for introducing the hydrogen gas into the engine;
   control means for controlling a hydrogen gas flow amount in the fuel supply conduit so that a desired amount of the hydrogen gas is introduced into the engine in accordance with an operating condition of the engine;
   a source of a fluid medium for heating the metal hydride in the tank;
   a passageway connecting the source with the heat exchange device in the tank;
   valve means arranged in the passageway for controlling the fluid medium, and;
   a pressure sensitive actuator having a diaphragm connected to the valve means and defining a pressure chamber which is in communication with a fuel tank, the pressure of the fuel tank causing the diaphragm to operate the valve means so that a desired pressure of the hydrogen gas is obtained in the tank.

21. A fuel supply system according to claim 20, wherein the metal hydride is a low temperature type, said source is a cooling water for the engine, said passageway is a recirculating passageway for the engine cooling water, and the valve means controlling the flow of the cooling water such that, when the pressure of the hydrogen gas in the tank is lower than a predetermined value the cooling water is introduced into the heat exchange device in the tank and when the pressure of the hydrogen gas in the tank is higher than a predetermined value the cooling water is made to by-pass the heat exchange device in the tank.

22. A fuel supply system according to claim 20, wherein the metal hydride is a high temperature type, said source is an engine exhaust gas, said passageway is an exhaust pipe of the engine, and the valve means controlling the flow of the exhaust gas such that, when the pressure of the hydrogen gas in the tank is lower than a predetermined value the exhaust gas is introduced into the heat exchange device in the tank, and when the pressure of the hydrogen gas in the tank is higher than a predetermined value, the exhaust gas is made to by-pass the heat exchange device in the tank.

23. A fuel supply system for an internal combustion engine, where a hydrogen gas is used as the fuel, the system comprising:
   a fuel tank in which a metal hydride is stored;
   a first heat exchange device arranged in the fuel tank for controlling the temperature of the metal hydride in the tank;
   a fuel supply conduit for connecting the fuel tank with the internal combustion engine for introducing the hydrogen gas into the engine;
   control means for controlling a hydrogen gas flow amount in the fuel supply conduit so that a desired amount of the hydrogen gas is introduced into the engine in accordance with an operating condition of the engine;
   a recirculating line for a heating medium;
   a second heat exchange device for obtaining a heat exchange between the exhaust gas and the heating medium in the recirculating line;
   valve means arranged in an exhaust pipe of the engine for controlling the flow of the exhaust gas to the second heat exchange device;
   a pressure sensitive actuator having a diaphragm connected to the valve means and defining a pressure chamber which is in communication with a fuel tank the pressure at the fuel tank causing the diaphragm to operate the valve means such that, when the pressure of the hydrogen gas in the tank is lower than a predetermined value the exhaust gas is introduced into the second heat exchanger for heating the heating medium in the recirculating line, to heat the first heat exchange device in the tank, and such that, when the pressure of the hydrogen gas in the tank is higher than a predetermined value the exhaust gas bypasses the second heat exchange device, to prevent a heating of the second heat exchange device and prevent a heating of the first heat exchange device in the tank.

* * * * *